US012200451B2

(12) United States Patent
Zhou et al.

(10) Patent No.: US 12,200,451 B2
(45) **Date of Patent: *Jan. 14, 2025**

(54) MICROPHONE AND ELECTRONIC DEVICE HAVING THE SAME

(71) Applicant: SHENZHEN SHOKZ CO., LTD., Guangdong (CN)

(72) Inventors: Wenbing Zhou, Shenzhen (CN); Xin Qi, Shenzhen (CN); Fengyun Liao, Shenzhen (CN); Yongshuai Yuan, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,071

(22) Filed: Nov. 5, 2023

(65) Prior Publication Data

US 2024/0073600 A1 Feb. 29, 2024

Related U.S. Application Data

(63) Continuation of application No. 17/660,406, filed on Apr. 23, 2022, now Pat. No. 11,843,923, which is a (Continued)

(30) Foreign Application Priority Data

Jan. 17, 2020 (CN) ......................... 202010051694.7

(51) Int. Cl.
*H04R 3/00* (2006.01)
*H04R 1/04* (2006.01)
(Continued)

(52) U.S. Cl.
CPC ............... *H04R 3/005* (2013.01); *H04R 1/04* (2013.01); *H04R 1/24* (2013.01); *H04R 1/2876* (2013.01); *H04R 1/406* (2013.01); *H04R 2410/01* (2013.01)

(58) Field of Classification Search
CPC . H04R 3/005; H04R 1/04; H04R 1/24; H04R 1/2876; H04R 1/406; H04R 2410/01
(Continued)

(56) References Cited

U.S. PATENT DOCUMENTS 7,475,598 B2 1/2009 Starnes et al.
7,684,576 B2 3/2010 Bank et al.
(Continued)

FOREIGN PATENT DOCUMENTS

CN 105101020 A 11/2015
CN 204887455 U 12/2015
(Continued)

OTHER PUBLICATIONS

International Search Report in PCT/CN2020/103201 mailed on Sep. 24, 2020, 4 pages.
(Continued)

*Primary Examiner* — Ammar T Hamid
(74) *Attorney, Agent, or Firm* — METIS IP LLC

(57) ABSTRACT

The present disclosure relates to microphones and electronic devices having the same. The microphone may include a housing for receiving sound signals, at least two transducers for vibrating to generate electrical signals in response to the sound signals, and a processing circuit for processing the electrical signals. Each of the at least two transducers may provide a distinctive resonance peak to the microphone.

20 Claims, 24 Drawing Sheets

Related U.S. Application Data continuation of application No. PCT/CN2020/103201, filed on Jul. 21, 2020.

(51) Int. Cl.

| | |
|---|---|
| ***H04R 1/24*** | (2006.01) |
| ***H04R 1/28*** | (2006.01) |
| ***H04R 1/40*** | (2006.01) |

(58) Field of Classification Search

USPC .................................................... 381/92, 122

See application file for complete search history.

(56) References Cited

U.S. PATENT DOCUMENTS

| | | | | |
|---|---|---|---|---|
| 11,843,923 | B2 * | 12/2023 | Zhou | H04R 1/24 |
| 2002/0044668 | A1 * | 4/2002 | Azima | H04R 7/18 381/431 |
| 2016/0282455 | A1 | 9/2016 | Scarsella et al. | |
| 2017/0195797 | A1 * | 7/2017 | Lazzari | H04R 9/025 |
| 2018/0288526 | A1 * | 10/2018 | Zou | H04R 29/005 |

FOREIGN PATENT DOCUMENTS

| | | | | |
|---|---|---|---|---|
| CN | 206620274 | U | 11/2017 | |
| DE | 102005008515 | A1 * | 8/2006 | H04R 1/265 |
| EP | 1665879 | B1 | 2/2007 | |
| EP | 3573347 | A1 | 11/2019 | |
| JP | 09163477 | A * | 6/1997 | |
| JP | H09163477 | A | 6/1997 | |
| JP | 5977473 | B1 | 8/2016 | |
| RU | 22039 | U1 | 3/2002 | |
| WO | 0154450 | A2 | 7/2001 | |

OTHER PUBLICATIONS

Written Opinion in PCT/CN2020/103201 mailed on Sep. 24, 2020, 5 pages.

The Extended European Search Report in European Application No. 20913630.8 mailed on Oct. 28, 2022, 7 pages.

Office Action in Russian Application No. 2022119375 mailed on Dec. 16, 2022, 16 pages.

Notice of Reasons for Rejection in Japanese Application No. 2022-540530 mailed on Jul. 24, 2023, 8 pages.

Notice of Preliminary Rejection for Rejection in Korean Application No. 10-2022-7024325 mailed on Sep. 30, 2024, 12 pages.

* cited by examiner

MICROPHONE AND ELECTRONIC DEVICE HAVING THE SAME

CROSS-REFERENCE TO RELATED APPLICATION

This application is a continuation of U.S. application Ser. No. 17/660,406, filed on Apr. 23, 2022, which is a continuation of International Application No. PCT/CN2020/103201, filed on Jul. 21, 2020, which claims priority of Chinese Patent Application NO. 202010051694.7, filed on Jan. 17, 2020, the contents of each of which are hereby incorporated by reference.

TECHNICAL FIELD

The present disclosure generally relates to microphones, and particularly, to microphones having at least two transducers.

BACKGROUND

Microphones are widely used in daily communication devices. In order to achieve good communication quality in different environments, microphones with high signal-to-noise ratios (SNR) and excellent anti-noise performances have become more and more popular. A microphone with excellent performances usually has a smooth frequency response curve and a high SNR. Existing techniques for making the smooth frequency response curve smooth often use a flat region before a resonance peak in a displacement response curve of a vibration device of a microphone. A resonance frequency of the vibration device may have to be set as a great value, which results in reducing the SNR or the sensitivity and poor communication quality of the microphone. Existing methods for improving the SNR or sensitivity of the microphone often set resonance frequencies to a voice frequency band. Because the vibration device of the microphone has a great Q value (or small damping), picking up a lot of sound signals near the resonance frequency (a high peak of the frequency response curve) results in uneven distributions of frequency signal in the whole frequency band, low intelligibility, and even distortion of the sound signals. Thus, it is desirable to provide microphones with high performances, such as high sensitivities, smooth frequency response curves, and wide frequency bands.

SUMMARY

An aspect of the present disclosure introduces a microphone. The microphone may include a housing for receiving sound signals, at least two transducers for vibrating to generate electrical signals in response to the sound signals, and a processing circuit for processing the electrical signals. Each of the at least two transducers may provide a distinctive resonance peak to the microphone.

In some embodiments, the at least two transducers may be arrayed in the housing in a direction parallel to a vibration direction of the at least two transducers.

In some embodiments, the at least two transducers may be arrayed in the housing in a direction perpendicular to a vibration direction of the at least two transducers.

In some embodiments, the electrical signals may be outputted from one of the at least two transducers, and the rest of the at least two transducers may transfer vibrations to the one of the at least two transducers.

In some embodiments, the rest of the at least two transducers may be physically connected to the one of the at least two transducers via at least one damping layer.

In some embodiments, the electrical signals may include at least two electrical outputs of the at least two transducers, wherein each of the at least two electrical outputs of the at least two transducers may be outputted from one of the at least two transducers.

In some embodiments, at least one transducer of the at least two transducers may be connected to at least one damping layer.

In some embodiments, the at least two electrical outputs of the at least two transducers may be processed using a Positive-Negative-Negative-Positive processing mode. The Positive-Negative-Negative-Positive processing mode may include adjusting phases of the at least two electrical outputs, and combining the adjusted at least two electrical outputs.

In some embodiments, the adjusting phases of the at least two electrical outputs may include reversing a phase of one of the at least two electrical outputs, and maintaining a phase of another one of the at least two electrical outputs.

In some embodiments, the at least two electrical outputs may be of adjacent transducers among the at least two transducers which are sorted in a descending order or an ascending order according to their resonance frequencies.

In some embodiments, the at least one damping layer may cover at least part of at least one surface of the transducer connected thereto.

In some embodiments, the at least one surface of the connected transducer may include at least one of an upper surface, a lower surface of the transducer, a lateral surface, or an internal surface.

In some embodiments, the at least one damping layer may be disposed on at least one position including an upper surface of the connected transducer, a lower surface of the connected transducer, a lateral surface of the connected transducer, or an interior of the connected transducer.

In some embodiments, the at least one damping layer may be disposed on at least one surface of the connected transducer at a predetermined angle.

In some embodiments, the predetermined angle may be 30°, 45°, 60°, or 90°.

In some embodiments, the at least one damping layer may be connected to the housing.

In some embodiments, the at least one damping layer may include at least two damping layers, and the at least two damping layers may be arranged symmetrically with respect to a center line of one of the at least two transducers.

In some embodiments, the microphone may further include at least one elastic element connected to one of the at least two transducers via the at least one damping layer.

In some embodiments, the at least one elastic element and the at least two transducers may be arrayed in the housing in a direction parallel to a vibration direction of the at least two transducers.

In some embodiments, the at least one elastic element and the at least two transducers may be arrayed in the housing in a direction perpendicular to a vibration direction of the at least two transducers.

In some embodiments, the at least one damping layer may cover at least part of at least one surface of the at least one elastic element.

In some embodiments, a width of the at least one damping layer may be variable.

In some embodiments, a thickness of the at least one damping layer may be variable.

In some embodiments, each of the at least two transducers may include at least one of a diaphragm, a piezo ceramic plate, a piezo film, or an electrostatic film.

In some embodiments, a structure of each of the at least two transducers may include at least one of a film, a cantilever, or a plate.

In some embodiments, the sound signals may be caused by at least one of gas, liquid, or solid.

In some embodiments, the sound signals may be transmitted from the housing to the at least two transducers according to a non-contact mode or a contact mode.

According to another aspect of the present disclosure, an electronic device comprising a microphone is provided. The microphone may include a housing for receiving sound signals, at least two transducers for vibrating to generate electrical signals in response to the sound signals, and a processing circuit for processing the electrical signals. Each of the at least two transducers may provide a distinctive resonance peak to the microphone.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
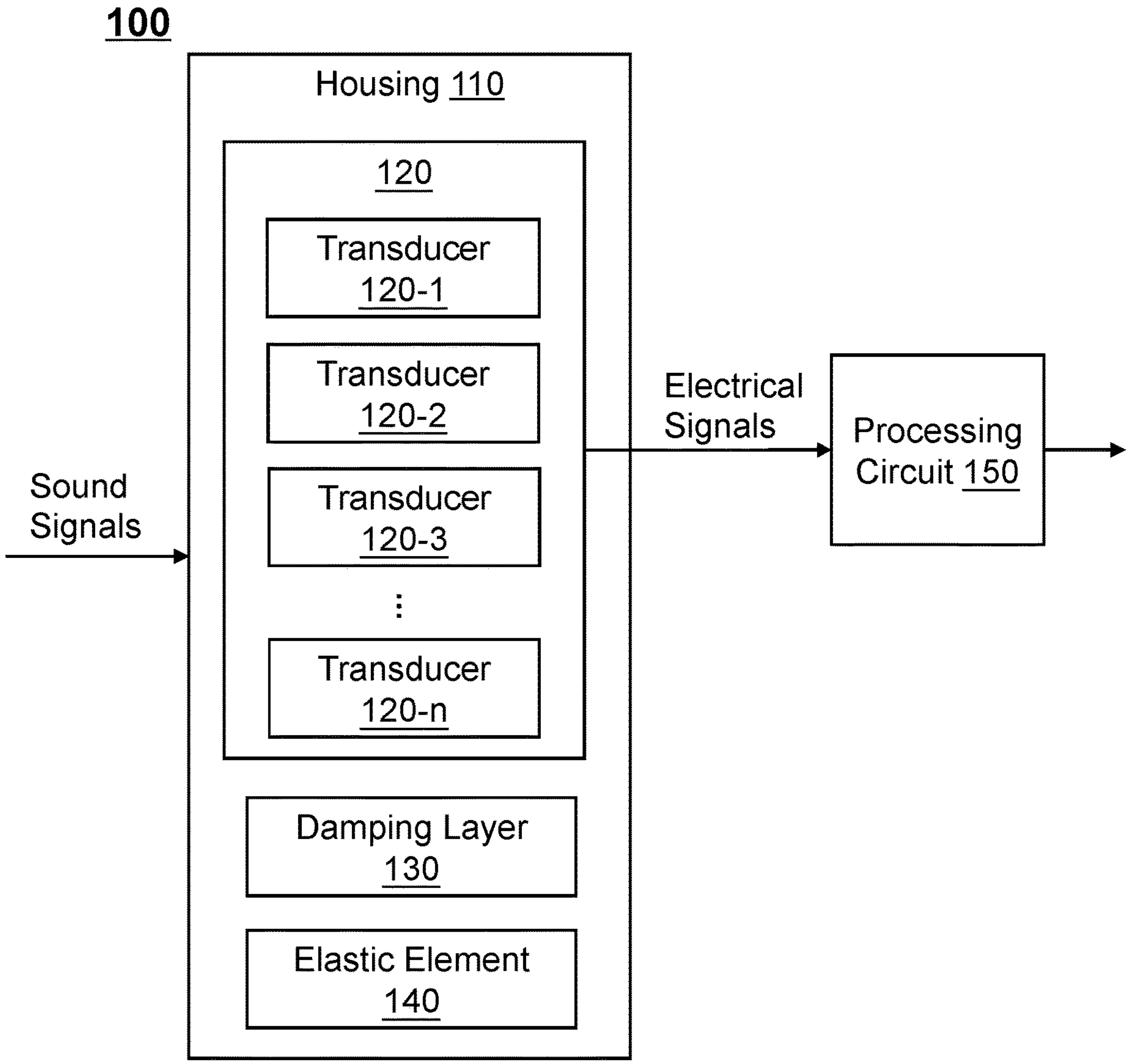
FIG. 1 is a block diagram illustrating an exemplary microphone according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to microphones and electronic devices having the same. The microphone may include a housing for receiving sound signals, at least two transducers for vibrating to generate electrical signals in response to the sound signals, and a processing circuit for processing the electrical signals. Each of the at least two transducers may provide a distinctive resonance peak to the microphone, thus improving the performance of the microphone to achieve, e.g., a higher sensitivity, a smoother frequency response, and/or a wider frequency band.

In some embodiments, the electrical signals may be outputted from one of the at least two transducers, and the rest of the at least two transducers may transfer vibrations to the one of the at least two transducers via at least one damping layer. In this way, the at least one damping layer may transfer the vibrations between the at least two transducers to form a vibration system with multiple resonance peaks, and meanwhile may decrease the Q value of each of the at least two transducers to smooth the frequency response of the microphone.

In some alternative embodiments, the electrical signals may include at least two electrical outputs of the at least two transducers. Each of the at least two electrical outputs of the at least two transducers may be outputted from one of the at least two transducers. Considering that the at least two electrical outputs may be out of phase due to different frequency characteristics of the transducers generating the at least two electrical outputs, the processing circuit may adjust phases of the at least two electrical outputs (e.g., by reversing a phase of one of the at least two electrical outputs and maintaining a phase of another one of the at least two electrical outputs), and combine the adjusted at least two electrical outputs to obtain the electrical signals representing the sound signals. In this way, by adjusting the phases of different electrical outputs derived from different transducers, it may avoid an undesirable reduction in signal strength of the electrical signals due to the cancellation of the at least two electrical outputs when combined.

In addition, the microphone may further include at least one elastic element. The at least one elastic element may be connected to one of the at least two transducers via the at least one damping layer. The at least one elastic element may provide an additional resonance frequency peak to the microphone, thus improving the performance of the microphone to achieve, e.g., a higher sensitivity, a smoother frequency response, and/or a wider frequency band.

FIG. 1 is a block diagram illustrating an exemplary microphone according to some embodiments of the present disclosure. For example, a microphone 100 may be a microphone of an electronic device, such as a telephone, an earphone, a headphone, a wearable device, a smart mobile device, a virtual reality device, an augmented reality device, a computer, a laptop, etc. The microphone 100 may include a housing 110, at least two transducers 120 (e.g., a transducer 120-1, a transducer 120-2, a transducer 120-3, a transducer **120-*n*), at least one damping layer 130, and a processing circuit 150**.

The housing 110 may be configured to receive sound signals. The housing 110 may form one or more closed or non-closed accommodation spaces. The at least two transducers 120 and the at least one damping layer 130 may be disposed into the closed or non-closed accommodation space(s) of the housing 110. In some embodiments, the housing 110 may receive the sound signals by contacting or not contacting with a sound source. For example, the microphone 100 may be a bone conduction microphone, and the housing 110 may receive the sound signals through direct contact with a user's body. As another example, the microphone 100 may be an air conduction microphone, and the housing 110 may include one or more openings to guide the sound signals into the housing 110 via air vibration, thereby causing each of the at least two transducers 120 to vibrate.

In some embodiments, the housing 110 may transmit the sound signals to each of the at least two transducers 120 (e.g., transducers 120-1, 120-2, 120-3) in a contact mode or a non-contact mode. For example, in the case that the microphone 100 is a bone conduction microphone, the transducer 120-1 may be physically attached to the housing 110 and vibrate with the vibration of the housing 110. As another example, in the case that the microphone 100 is an air conduction microphone, the transducer 120-1 may be actuated to vibrate by air vibration in the housing 110.

In some embodiments, the at least two transducers 120 may be connected together via the at least one damping layer 130. In some embodiments, the connection between the at least one damping layer 130 and the at least two transducers 120 of the microphone 100 may include bonding, riveting, thread connection, integral forming, suction connection, or the like, or any combination thereof.

Each transducer 120 may be configured to vibrate in response to the sound signals, and/or transfer vibrations to other transducer(s) 120 via the at least one damping layer 130. In some embodiments, the at least two transducers 120 may be arrayed in the housing 110 in a specific distribution mode, for example, in a direction parallel or perpendicular to a vibration direction of the at least two transducers 120.

In some embodiments, each transducer 120 may be capable of converting the sound signals into an electrical output via an energy conversion process. The electrical signals to be processed by the processing circuit 150 may include all or part of the electrical outputs from the transducers 120. For brevity, the transducer that outputs the electrical output to the processing circuit 150 may be referred to as an output transducer. The output transducer may be configured to receive the sound signals and, if any, the vibration of other transducer(s) 120 transferred to it. For example, the at least two transducers 120 may include a first transducer and a second transducer connected via a damping layer. The second transducer, in one aspect, vibrates in response to the sound signal, and in another aspect, receives the vibration transferred from the first transducer which does not electrically connect to the processing circuit 150. That is, the vibration of the second transducer is affected by both the sound signal transmitted through the housing 110 and the vibration of the first transducer. Then, the vibration of the second transducer (i.e., the output transducer) may be converted to the electrical output and transmitted to the processing circuit 150 for further processing.

In some embodiments, each transducer 120 may have a distinctive resonance peak. The coexistence of the transducers 120 may provide multiple resonance peaks in the frequency response curve of the microphone 100, thus improving the performance of the microphone to achieve, e.g., a higher sensitivity, a smoother frequency response, and/or a wider frequency band.

In some embodiments, a signal conversion type of each of the at least two transducers 120 may include an electromagnetic type (e.g., a moving-coil type, a moving-iron type, etc.), a piezoelectric type, an inversed piezoelectric type, an electrostatic type, an electret type, a planar magnetic type, a balanced armature type, a thermoacoustic type, or the like, or any combination thereof. In some embodiments, each of the at least two transducers 120 may include a diaphragm, a piezoceramic plate, a piezo film, an electrostatic film, or the like, or any combination thereof. In some embodiments, the shape of each of the at least two transducers 120 may be variable. For example, the shape of each of the at least two transducers 120 may include a circle, a rectangle, a square, an oval, or the like, or any combination thereof. In some embodiments, a structure of each of the at least two transducers 120 may be variable. For example, the structure of each of the at least two transducers 120 may include a film, a cantilever, a plate, or the like, or any combination thereof.

The at least one damping layer 130 may be configured to change a composite damping and/or a composite weight of a transducer to adjust the frequency response curve of the microphone 100. For example, the at least one damping layer 130 may be disposed on the transducer 120-1 to adjust the composite damping of the transducer 120-1. This arrangement may reduce the sharpness of the resonance peak of the transducer 120-1, so that the microphone 100 may have a flatter frequency response curve. Additionally, the at least one damping layer 130 may adjust the composite weight of the transducer 120-1, which may shift forward or backward the resonance peak of the transducer 120-1. In some embodiments, the at least one damping layer 130 may include a film, a block, a complex structure, or the like, or any combination thereof. In some embodiments, a material of the at least one damping layer 130 may include metal, inorganic nonmetal, polymer materials, composite materials, or the like, or any combination thereof.

In some embodiments, the at least one damping layer 130 may be disposed on any position of a transducer. For example, the at least one damping layer 130 may be disposed on an upper surface of the transducer 120-1, a lower surface of the transducer 120-2, a lateral surface of the transducer 120-1, an interior of the transducer 120-1, or the like, or any combination thereof. In some embodiments, the at least one damping layer 130 may cover at least part of a surface of a transducer. For example, the at least one damping layer 130 may cover part of a lower surface or an upper surface of the transducer 120-1 (e.g., see the microphone 100 illustrated in FIG. 8). As another example, the at least one damping layer 130 may completely cover a lower surface or an upper surface of the transducer 120-1 (e.g., see the microphone 100 illustrated in FIG. 6C). In some embodiments, the at least one damping layer 130 may connect to both the at least two transducers 120 and the housing 110 (e.g., see the microphone 100 illustrated in FIGS. 7A-7C). In some embodiments, the at least one damping layer 130 may connect to the at least two transducers 120 and not connect to the housing 110 (e.g., see the microphone 100 illustrated in FIG. 8). In some embodiments, the at least one damping layer 130 may be disposed on at least one surface of a transducer at a predetermined angle. For example, the predetermined angle may include 10°, 15°, 30°, 45°, 60°, 70°, 90°, etc. In some embodiments, the at least one damping layer 130 may include two or more damping layers. The two or more damping layers may be arranged symmetrically (e.g., see the microphone 100 illustrated in FIGS. 10A-10C) or asymmetrically (e.g., see the microphone 100 illustrated in FIG. 9A-9C) with respect to a centerline of a transducer. In some embodiments, a width of each damping layer 130 may be the same or different. The width of each damping layer may be 10 μm, 20 μm, 30 μm, 40 μm, 50 μm, 60 μm, 70 μm, 80 μm, 90 μm, 100 μm, 500 μm, 1 mm, 2 mm, 3 mm, 4 mm, 5 mm, etc. In some embodiments, a thickness of each damping layer 130 may be the same or different. The thickness of each damping layer may be 0.5 μm, 1 μm, 2 μm, 3 μm, 4 μm, 5 μm, 6 μm, 10 μm, 50 μm, 0.1 mm, 0.2 mm, 0.4 mm, 0.5 mm, 0.6 mm, 0.8 mm, 1 mm, etc.

In some embodiments, the microphone 100 may further include one or more elastic elements 140. The elastic element(s) may be connected to the transducer(s) 120 (e.g., the output transducer) via one or more damping layers. The elastic element(s) may be configured to vibrate in response to the sound signals and transmit the vibration to its connected transducer so as to provide another resonance peak to the microphone 100. It shall be noted that, compared to a transducer that can also provide a resonance peak to the microphone 100, the elastic element 140 may not be capable to directly convert the sound signal to an electrical output. In some embodiments, the one or more damping layers may cover at least part of a surface of the elastic element 140. For example, the one or more damping layers may cover part of an upper surface of the elastic element 140 (e.g., see the microphone 100 illustrated in FIG. 12C). As another example, the one or more damping layers may completely cover a lower surface of the elastic element 140 (e.g., see the microphone 100 illustrated in FIG. 12A). In some embodiments, the transducers 120 and the elastic element 140 may be arrayed in the housing 110 in a direction parallel or perpendicular to the vibration direction of the transducers 120.

The processing circuit 150 may be configured to process the electrical signals. For example, the processing circuit 150 may generate sub-band signals based on the electrical signals according to one or more bandpass filters. As another example, the processing circuit 150 may perform one or more functions on the electrical signals for further processing. Exemplary functions may include amplification, modulation, simple filtering, or the like, or any combination thereof.

It should be noted that the above descriptions of the microphone 100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the damping layer(s) may cover part of a surface of a transducer 120 and completely cover a surface of the elastic element 140. As another example, each transducer 120 may be correspondingly connected to one elastic element.

Figure 2A:
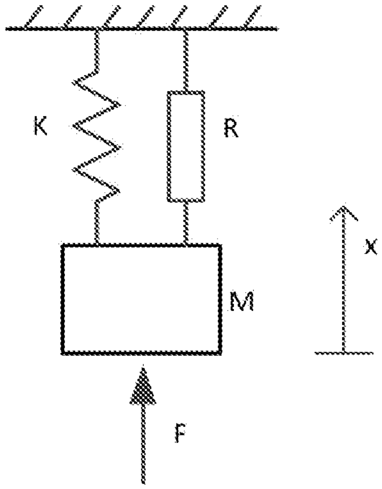
FIG. 2A is a schematic diagram illustrating an exemplary spring-mass-dam per system of a transducer according to some embodiments of the present disclosure.

FIG. 2A is a schematic diagram illustrating an exemplary spring-mass-damper system of a transducer according to some embodiments of the present disclosure. In a microphone, a transducer thereof may be simplified and equivalent to a spring-mass-damper system as shown in FIG. 2A. When the microphone works, the spring-mass-damper system may be forced to vibrate under an excitation force.

As shown in FIG. 2A, the spring-mass-damper system may be moved according to a differential equation (1):

$$M\frac{d^2x}{dt^2}+R\frac{dx}{dt}+Kx=F\cos\omega, \quad (1)$$

where M denotes a mass of the spring-mass-damper system, x denotes a displacement of the spring-mass-damper system, R denotes the damping of the spring-mass-damper system, K denotes an elastic coefficient of the spring-mass-dam per system, F denotes an amplitude of a driving force, and w denotes a circular frequency of an external force.

The differential equation (1) may be solved to obtain displacements under steady-state (2):

$$x=x_a\cos(\omega t-\theta), \quad (2)$$

where x denotes a deformation of the spring-mass-damper system when the microphone works, which equals to a value of an output electrical signal, $$x_a=\frac{F}{\omega|Z|}=\frac{F}{\omega\sqrt{R^2+(\omega M-K\omega^{-1})^2}},$$

$x_a$ denotes an output displacement, Z denotes a mechanical impedance, and θ denotes an oscillation phase.

Normalization of a ratio A of displacement amplitudes may be described as equation (3):

$$A=\frac{x_a}{x_{ao}}=\frac{Q_m}{\sqrt{\frac{f^2}{f_0}+\left(\frac{f^2}{f_0}-1\right)^2Q_m^2}}, \quad (3)$$

$$\text{where } x_{a0}=\frac{F}{K},$$

$x_{a0}$ denotes a displacement amplitude under steady-state (or a displacement amplitude when $\omega=0$), $$\frac{f}{f_0}=\frac{\omega}{\omega_0},$$

$f/f_0$ denotes a ratio of a frequency of an external force to a natural frequency, $\omega_0=K/M$, $\omega_0$ denotes a circular frequency of a vibration, $$Q_m=\frac{\omega_0 M}{R},$$

and $Q_m$ denotes a mechanical quality factor.

Figure 2B:
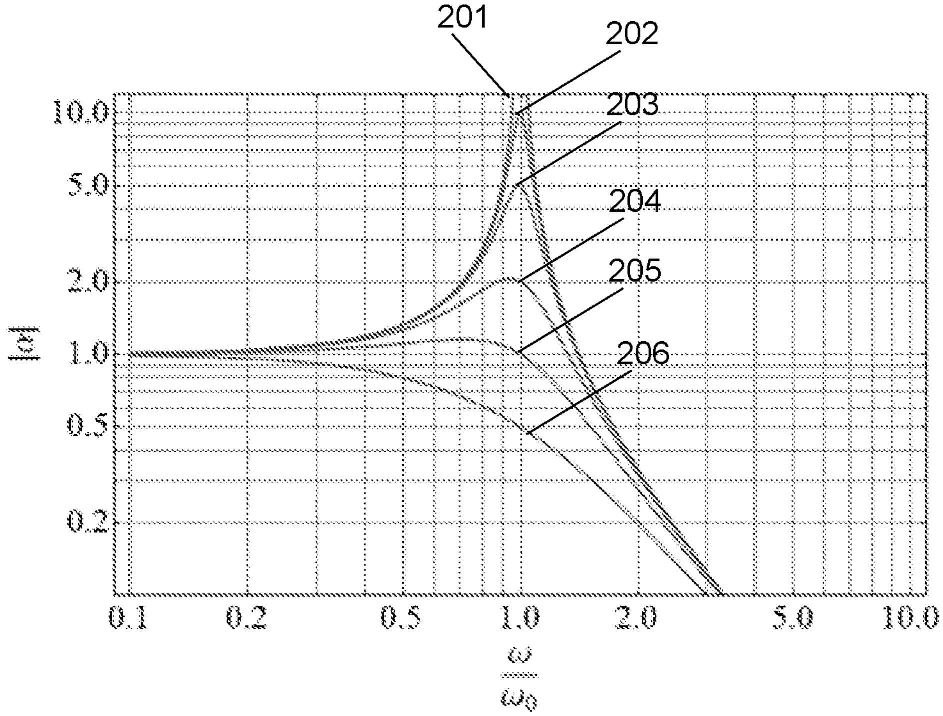
FIG. 2B is a schematic diagram illustrating exemplary normalized displacement resonance curves of spring-mass-damper systems according to some embodiments of the present disclosure.

FIG. 2B is a schematic diagram illustrating exemplary normalized displacement resonance curves of spring-mass-damper systems according to some embodiments of the present disclosure.

A transducer included in a microphone may generate an electrical output according to relative displacement between the transducer and the housing of the microphone. For example, an electret microphone generates electrical outputs according to a distance change between a deformed diaphragm transducer and a substrate. As another example, a cantilever bone conduction microphone may generate electrical outputs according to an inverse piezoelectric effect caused by a deformed cantilever transducer. The greater of a displacement that the transducer deforms, the greater the electrical output that the microphone may output. Thus, in the microphone, the transducer thereof may be simplified and equivalent to a spring-mass-damper system. Displacement resonance curves of transducers may conform to the displacement resonance curves of spring-mass-damper systems as shown in FIG. 2B. As shown in FIG. 2B, lines 201, 202, 203, 204, 205, and 206 may represent displacement resonance curves of spring-mass-damper systems with damping values arranged in an ascending order. The smaller of the damping value (e.g., a material damping value, a structural damping value, etc.) of the transducer, the greater of the sharpness and the narrower of a 3 dB bandwidth at a resonance peak of the displacement response curve may be. In some embodiments, the resonance peak may not be set in a voice frequency range in a microphone with excellent performances.

Figure 3A:
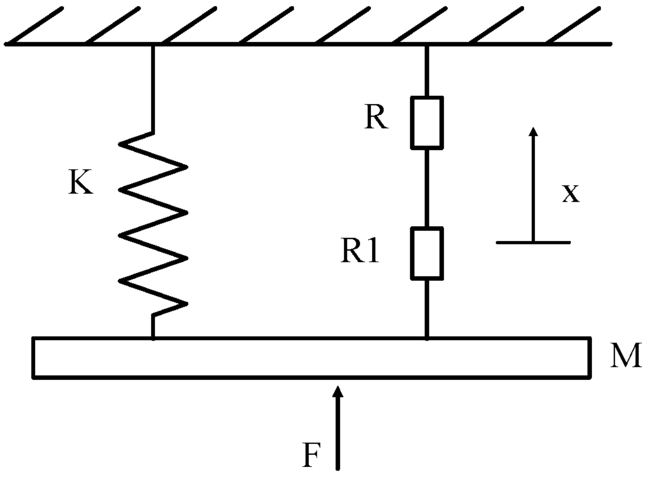
FIG. 3A is a schematic diagram illustrating an exemplary equivalent model of a transducer connected to a damping layer according to some embodiments of the present disclosure.

FIG. 3A is a schematic diagram illustrating an exemplary equivalent model of a transducer connected to a damping layer according to some embodiments of the present disclosure. As shown in FIG. 3A, R denotes a damping of the transducer, K denotes an elastic coefficient of the transducer, and R1 denotes a damping of the damping layer. In some embodiments, the composite damping of the transducer may increase by adding the damping layer. The damping of the transducer may be changed.

Figure 3B:
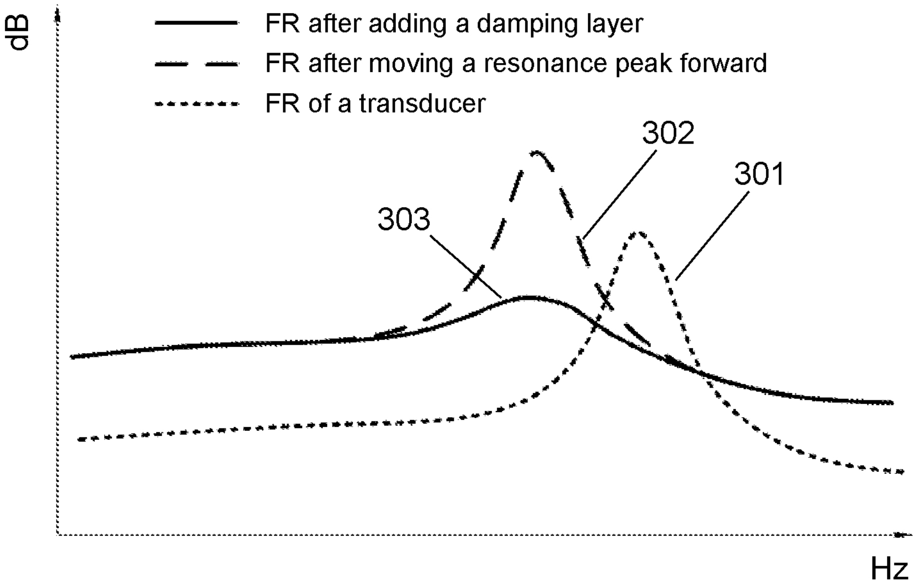
FIG. 3B is a schematic diagram illustrating an exemplary frequency response curve of a transducer, an exemplary frequency response curve after moving a resonance peak of the transducer forward, and an exemplary frequency response curve after adding a damping layer in the transducer according to some embodiments of the present disclosure.

FIG. 3B is a schematic diagram illustrating an exemplary frequency response curve of a transducer, an exemplary frequency response curve after moving a resonance peak of the transducer forward (i.e., moving the resonance peak toward the lower frequency zone), and an exemplary frequency response curve after adding a damping layer in the transducer according to some embodiments of the present disclosure. As shown in FIG. 3B, dotted line 301 represents the frequency response curve of the transducer, dotted line 302 represents the frequency response curve after moving the resonance peak of the transducer forward, and solid line 303 represents the frequency response curve after adding the damping layer in the transducer.

In some embodiments, as shown by dotted lines 301 and 302 in FIG. 3B, in order to improve a whole sensitivity of a microphone, the natural frequency of the transducer may be brought forward by moving the resonance peak forward to a voice frequency range (e.g., 10 Hz to 7 kHz) to improve the sensitivity of the microphone before the resonance peak. The output displacement $x_a$ may be determined according to equation (4):

$$x_a=\frac{F}{\omega|Z|}=\frac{F}{\omega\sqrt{R^2+(\omega M-K\omega^{-1})^2}}, \quad (4)$$

according to equation (4), if $\omega<\omega_0$, $\omega M<K\omega^{-1}$. If decreasing $\omega_0$ of the transducer by increasing M and/or decreasing K, $|\omega M<K\omega^{-1}|$ may decrease, and the corresponding output displacement $x_a$ may increase. If $\omega=\omega_0$, $\omega M=K\omega^{-1}$. The output displacement $x_a$ may be constant if decreasing or increasing $\omega_0$ of the transducer. If $\omega<\omega_0$, $\omega M>K\omega^{-1}$. If decreasing $\omega_0$ of the transducer by increasing M and/or decreasing K, $|\omega M<K\omega^{-1}|$ may increase, and the corresponding output displacement $x_a$ may decrease.

In some embodiments, as the resonance peak moving forward, the resonance peak may appear in the voice frequency range. If picking up a plurality of signals near the resonance peak, the communication quality may be bad due to the sharp fluctuation around the resonance peak. In some embodiments, adding the damping layer to the transducer may increase energy loss, especially energy loss near the resonance peak, during vibration. A reciprocal of Q value may be described according to equation (5):

$$Q^{-1} = \frac{\Delta f}{\sqrt{3} f_0}, \quad (5)$$

where $Q^{-1}$ denotes the reciprocal of Q value, Δf denotes a 3 dB bandwidth (a difference value of two frequencies f1, f2 at half of the resonance amplitude, respectively, of Δf=f1−f2), and f0 denotes a resonance frequency. It shall be noted that the Q value may reflect the sharpness of the resonance peak. A larger Q value may correspond to a sharper resonance peak.

As the damping of the transducer increases, Q value decreases, the sharpness of the resonance reduces, and the corresponding 3 dB bandwidth increases. In some embodiments, the damping of the damping layer may be not constant during a deforming process and may be great under great force or great amplitude. As a result, the damping on the amplitudes in a non-resonance area may be smaller than the damping on the amplitudes in a resonance area. As shown by dotted line 302 and solid line 303 in FIG. 3B, the sensitivity of the microphone in the non-resonance area may not decrease obviously, while the Q value in the resonance area may decrease fiercely by adding a suitable damping layer in the transducer. Therefore, by moving the resonance peak forward to the voice frequency range and reducing the Q value at the resonance peak, the frequency response curve of the microphone may be relatively flat, thereby improving the performance of the microphone.

Figure 4:
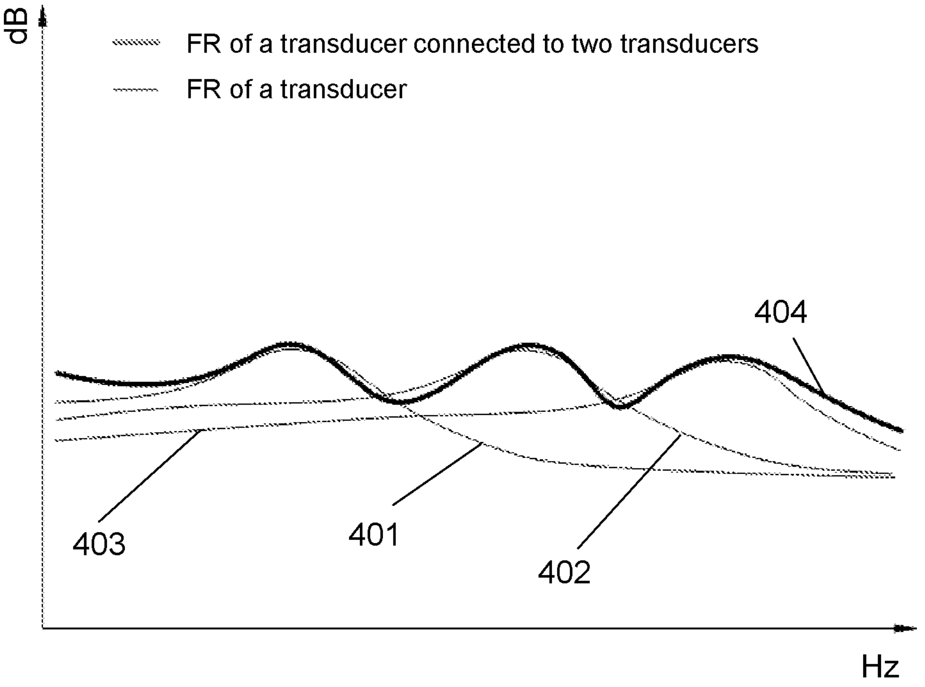
FIG. 4 is a schematic diagram illustrating exemplary frequency response curves of different transducers according to some embodiments of the present disclosure.

FIG. 4 is a schematic diagram illustrating exemplary frequency response curves of different transducers according to some embodiments of the present disclosure. As shown in FIG. 4, each of lines 401, 402, and 403 represents a frequency response curve of a single transducer among three transducers. Line 404 represents the frequency response curve of an output transducer when the three transducers are physically connected to each other in series by two damping layers. The output transducer may be any one of the three transducers. The frequency response curve of the output transducer (i.e., line 404) may have three resonance peaks each of which corresponds to one of the three transducers (i.e., lines 401, 402, and 403). That is, each of the three transducers may transfer vibrations to the output transducer and thus provide a distinctive resonance peak to the output transducer. As such, the sensitivity of the output transducer (represented by line 404) may be higher than the sensitivity of any one of the three transducers (represented by lines 401, 402, and 403, respectively).

According to FIG. 4, the count of transducers connected in series may affect the frequency response curve of the output transducer. The more transducers connected in series, the flatter the frequency response curve of the output transducer. In some embodiments, a frequency response range of the output transducer may be adjusted by adjusting the resonance peak of each single transducer of the transducers connected in series. For example, one or more resonance peaks in the frequency response of the output transducer may be adjusted to a voice frequency range, such as 20 Hz to 8 kHz, 50 Hz to 7 kHz, 100 Hz to 5 kHz, etc.

Figure 5A:
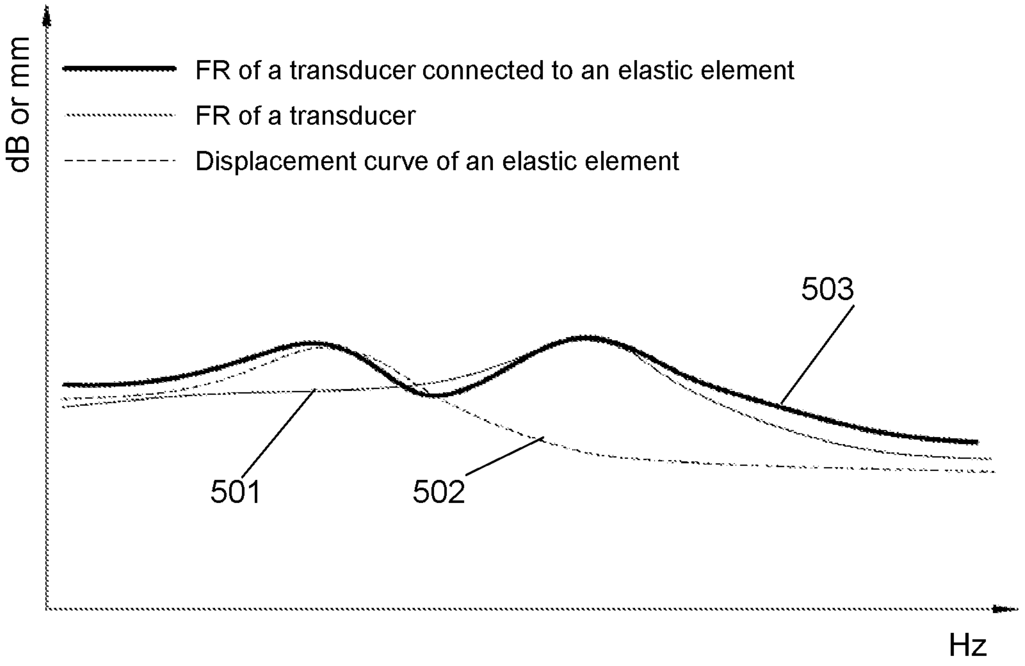
FIG. 5A is a schematic diagram illustrating an exemplary frequency response curve of a transducer, an exemplary displacement curve of an elastic element, and an exemplary frequency response curve of the transducer when it is connected to the elastic element according to some embodiments of the present disclosure.

FIG. 5A is a schematic diagram illustrating an exemplary frequency response curve of a transducer, an exemplary displacement curve of an elastic element, and an exemplary frequency response curve of the transducer when it is connected to the elastic element according to some embodiments of the present disclosure. As shown in FIG. 5A, line 501 represents the frequency response curve of the transducer when it is not connected to the elastic element. Dotted line 502 represents the displacement curve of the elastic element. Solid line 503 represents the frequency response curve of the transducer when it is connected to the elastic element via a damping layer. The elastic element connected to the transducer may transfer vibrations to the transducer and thus provide a resonance peak to the transducer. The frequency response curve of the transducer connected to the elastic element (i.e., solid line 503) may have two resonance peaks each of which corresponds to a resonance peak of the transducer (i.e., line 501) or the elastic element (i.e., dotted line 502). The sensitivity of the transducer connected to the elastic element (represented by solid line 503) may be higher than the sensitivity of the transducer (represented by dotted line 502) not connected to the elastic element.

Figure 5B:
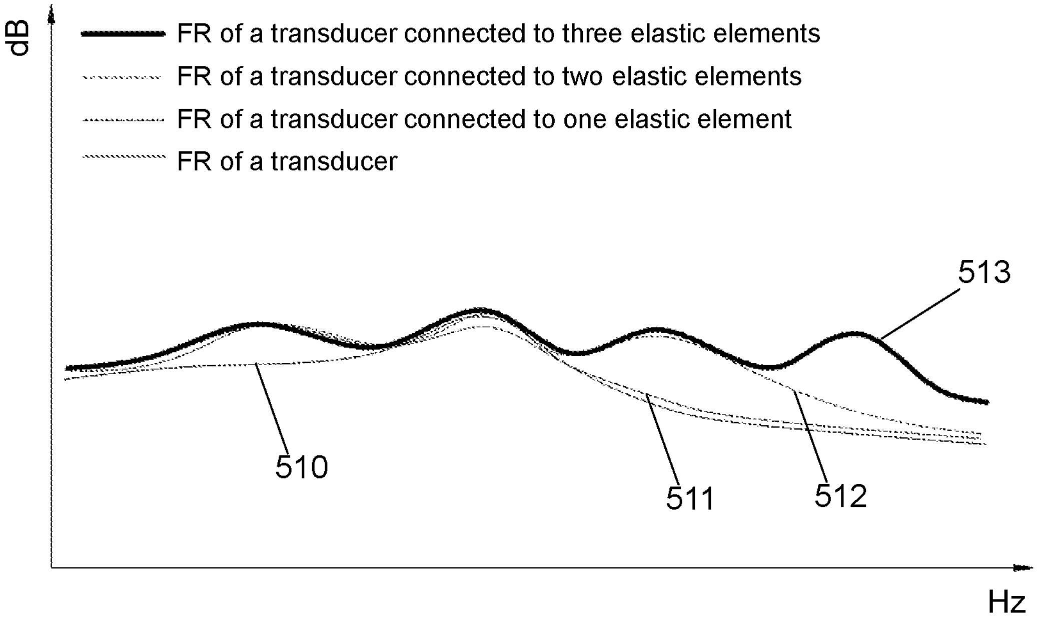
FIG. 5B is a schematic diagram illustrating exemplary frequency response curves of a transducer connected to different counts of elastic elements according to some embodiments of the present disclosure.

FIG. 5B is a schematic diagram illustrating exemplary frequency response curves of a transducer connected to different counts of elastic elements according to some embodiments of the present disclosure. As shown in FIG. 5B, line 510 represents the frequency response curve of the transducer not connected to any elastic element. Line 511 represents the frequency response curve of the transducer connected to one elastic element. Line 512 represents the frequency response curve of the transducer connected to two elastic elements. Solid line 513 represents the frequency response curve of the transducer connected to three elastic elements. The frequency response curve of the transducer connected to the three elastic elements (i.e., solid line 513) may have four resonance peaks each of which corresponds to a resonance peak of the transducer (i.e., line 510) or one of the three elastic elements. Each elastic element connected to the transducer may transfer vibrations to the transducer and thus provide a resonance peak to the transducer. The sensitivity of the transducer connected to the three elastic elements (represented by solid line 513) may be higher than the sensitivity of the transducer connected to less than three elastic elements (represented by lines 510, 511, or 512).

According to FIGS. 5A and 5B, the count of elastic elements connected to the transducer may affect the frequency response curve of the transducer (i.e., the output transducer). The more elastic elements connected to the transducer, the flatter the frequency response curve of the transducer and the higher the sensitivity of the transducer. In some embodiments, one or more resonance peaks in the frequency response of the transducer may be adjusted by adjusting a resonance peak of the transducer or each of the elastic elements connected to the transducer.

Figure 6A:
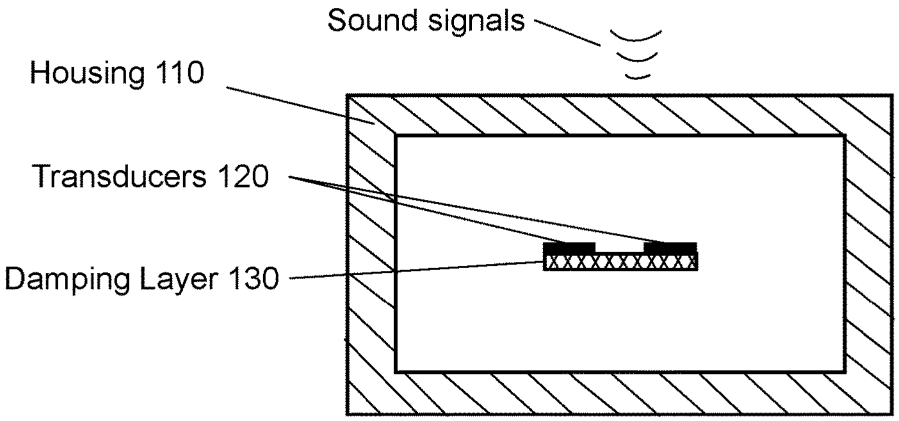
FIG. 6A is a structural schematic diagram illustrating an exemplary microphone according to some embodiments of the present disclosure.

FIG. 6A is a structural schematic diagram illustrating an exemplary microphone according to some embodiments of the present disclosure. As shown in FIG. 6A, the microphone 100 may include a housing 110, two transducers 120, and a damping layer 130 connected to each of the two transducers 120 and disconnected to the housing 110. Each of the two transducers 120 may vibrate in response to the sound signals. For example, in the case of a bone conduction microphone, each of the two transducers 120 may be directly attached to the housing and vibrate with the vibration of the housing 110. In the case of an air conduction microphone, for example, the transducers 120 and/or the damping layer 130 may form one or more acoustic cavities, the housing 110 may include one or more openings that let in air conduction sound, and each of the two transducers 120 may vibrate in response to the air vibration inside the housing 110. The two transducers 120 may be disposed on a same side of the damping layer 130. The damping layer 130 may cover a lower surface of each of the two transducers 120.

Figure 6B:
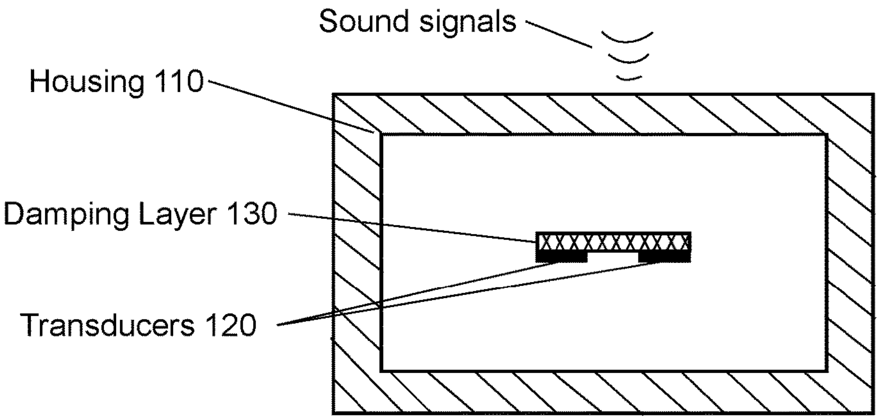
FIG. 6B is a structural schematic diagram illustrating an exemplary microphone according to some embodiments of the present disclosure.

FIG. 6B is a structural schematic diagram illustrating an exemplary microphone according to some embodiments of the present disclosure. As shown in FIG. 6B, the microphone 100 may include a housing 110, two transducers 120, and a damping layer 130 connected to each of the two transducers 120 and disconnected to the housing 110. Similar to FIG. 6A, the two transducers 120 may be disposed on a same side of the damping layer 130. The damping layer 130 may cover an upper surface of each of the two transducers 120.

Figure 6C:
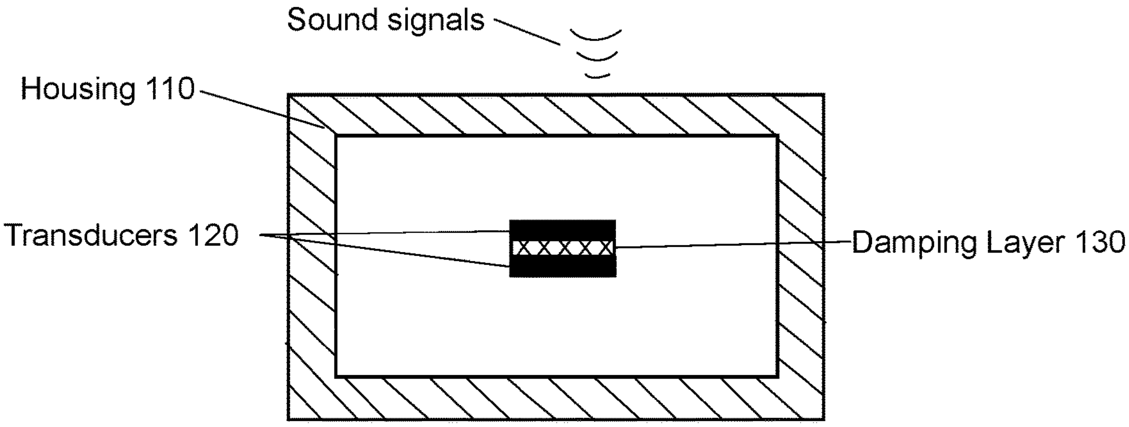
FIG. 6C is a structural schematic diagram illustrating an exemplary microphone according to some embodiments of the present disclosure.

FIG. 6C is a structural schematic diagram illustrating an exemplary microphone according to some embodiments of the present disclosure. As shown in FIG. 6C, the microphone 100 may include a housing 110, two transducers 120, and a damping layer 130 connected to each of the two transducers 120 and disconnected to the housing 110. The two transducers 120 may be disposed on opposite sides of the damping layer 130. The damping layer 130 may cover a lower surface of one of the two transducers 120 and an upper surface of the other of the two transducers 120. The two transducers 120 and the damping layer 130 may form a sandwich structure. The damping layer 130 may sandwich between the two transducers 120.

Figure 7A:
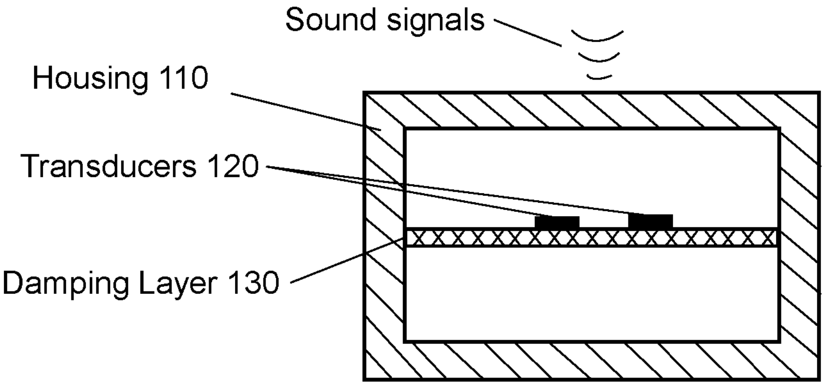
FIG. 7A is a structural schematic diagram illustrating an exemplary microphone according to some embodiments of the present disclosure.

FIG. 7A is a structural schematic diagram illustrating an exemplary microphone according to some embodiments of the present disclosure. As shown in FIG. 7A, the microphone 100 may include a housing 110, two transducers 120, and a damping layer 130 connected to each of the two transducers 120 and the housing 110. Similar to FIG. 6A, the two transducers 120 may be disposed on a same side of the damping layer 130. The damping layer 130 may connect to the housing 110 at two ends of the damping layer 130. The damping layer 130 may cover a lower surface of each of the two transducers 120.

Figure 7B:
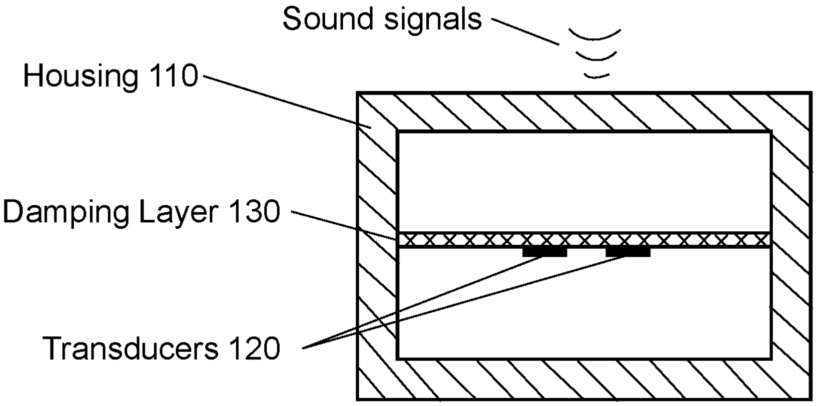
FIG. 7B is a structural schematic diagram illustrating an exemplary microphone according to some embodiments of the present disclosure.

FIG. 7B is a structural schematic diagram illustrating an exemplary microphone according to some embodiments of the present disclosure. As shown in FIG. 7B, the microphone 100 may include a housing 110, two transducers 120, and a damping layer 130 connected to each of the two transducers 120 and the housing 110. Similar to FIG. 7A, the two transducers 120 may be disposed on a same side of the damping layer 130. The damping layer 130 may connect to the housing 110 at two ends of the damping layer 130. The damping layer 130 may cover an upper surface of each of the two transducers 120.

Figure 7C:
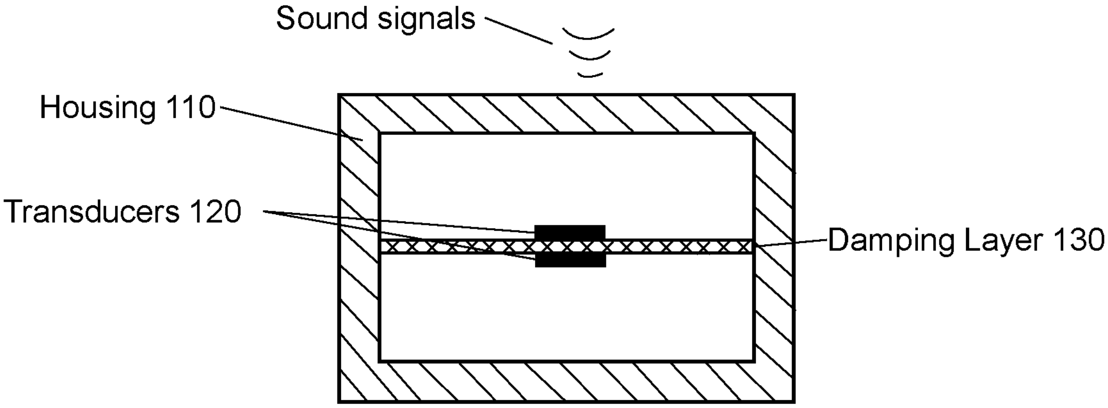
FIG. 7C is a structural schematic diagram illustrating an exemplary microphone according to some embodiments of the present disclosure.

FIG. 7C is a structural schematic diagram illustrating an exemplary microphone according to some embodiments of the present disclosure. As shown in FIG. 7C, the microphone 100 may include a housing 110, two transducers 120, and a damping layer 130 connected to each of the two transducers 120 and the housing 110. Similar to FIG. 6C, the two transducers 120 may be disposed on opposite sides of the damping layer 130. The damping layer 130 may connect to the housing 110 at two ends of the damping layer 130. The damping layer 130 may cover a lower surface of one of the two transducers 120 and an upper surface of the other of the two transducers 120. The two transducers 120 and the damping layer 130 may form a sandwich structure. The damping layer 130 may sandwich between the two transducers 120.

Figure 8:
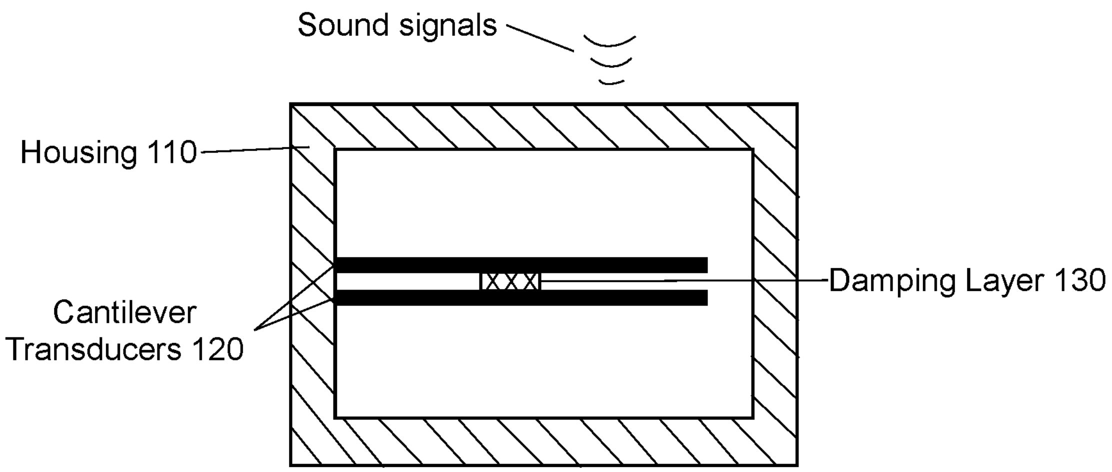
FIG. 8 is a structural schematic diagram illustrating an exemplary microphone according to some embodiments of the present disclosure.

FIG. 8 is a structural schematic diagram illustrating an exemplary microphone according to some embodiments of the present disclosure. As shown in FIG. 8, the microphone 100 may include a housing 110, two cantilever transducers 120 connecting to the housing 110, respectively, and a damping layer 130 connected to each of the two cantilever transducers 120. Each of the two cantilever transducers 120 may be fixed to the housing 110 at an end (also referred to as "fixed end"). On this occasion, the vibration of the housing 110 may be transferred to each cantilever transducer 120 via the fixed end and thus cause each cantilever transducer 120 to vibrate to generate one or more electrical outputs. The damping layer 130 may be disconnected to the housing 110. Similar to FIGS. 6C and 7C, the two cantilever transducers 120 may be disposed on opposite sides of the damping layer 130. The damping layer 130 may cover at least part of an upper surface of one of the two cantilever transducers 120 and at least part of a lower surface of the other of the two cantilever transducers 120. The two cantilever transducers 120 and the damping layer 130 may form a sandwich structure. The damping layer 130 may sandwich between the two cantilever transducers 120.

Figure 9A:
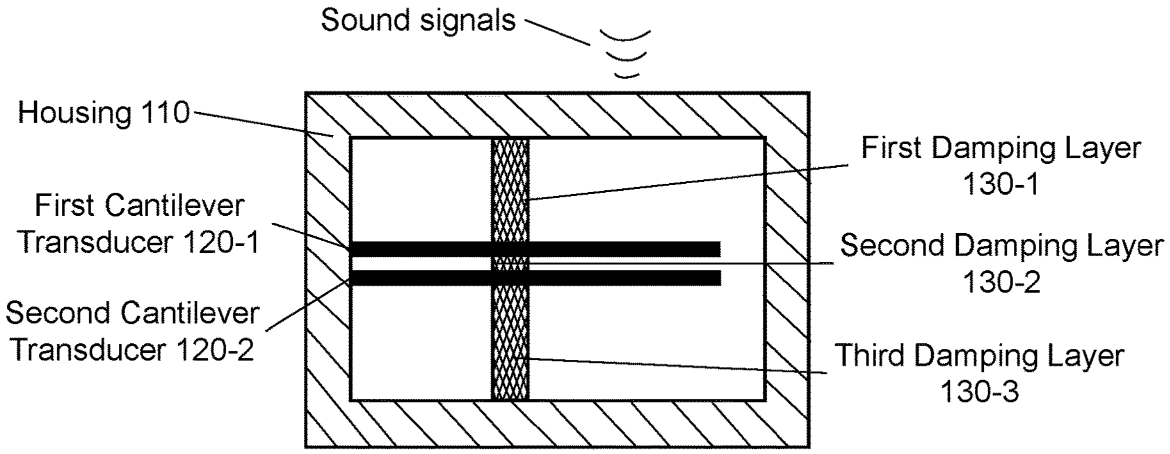
FIG. 9A is a structural schematic diagram illustrating an exemplary microphone according to some embodiments of the present disclosure.
Figure 9B:
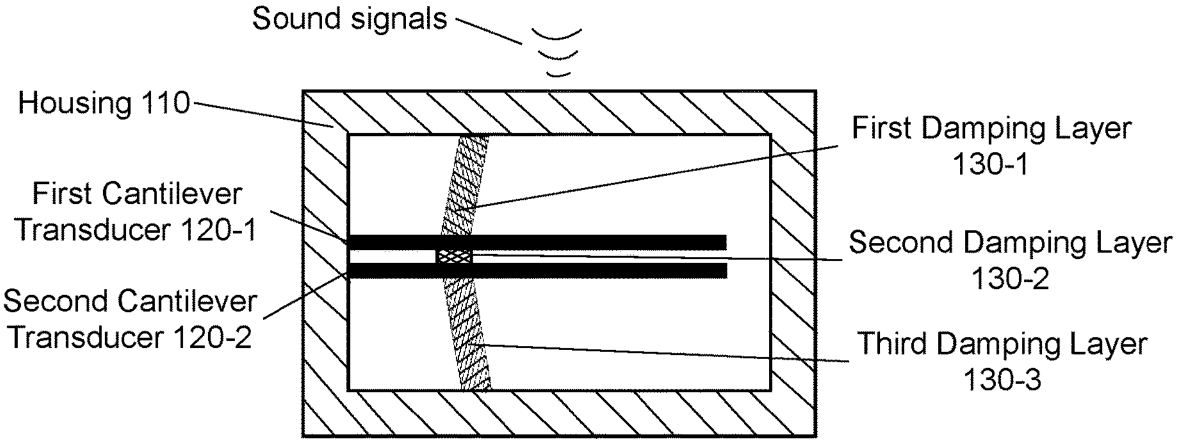
FIG. 9B is a structural schematic diagram illustrating an exemplary microphone according to some embodiments of the present disclosure.
Figure 9C:
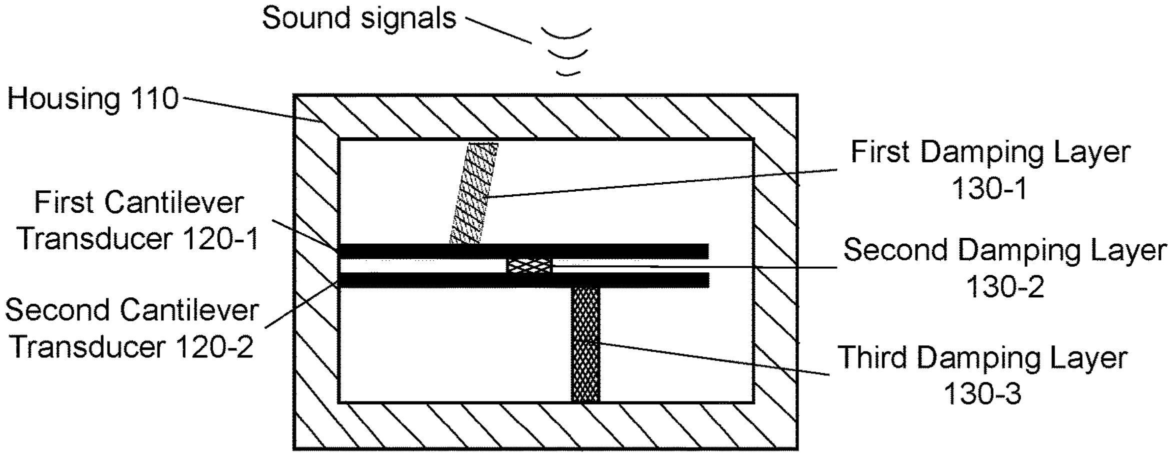
FIG. 9C is a structural schematic diagram illustrating an exemplary microphone according to some embodiments of the present disclosure.

FIGS. 9A to 9C are structural schematic diagrams illustrating an exemplary microphone according to some embodiments of the present disclosure. As shown in FIGS. 9A to 9C, the microphone 100 may include a housing 110, two cantilever transducers 120 (i.e., a first cantilever transducer 120-1 and a second cantilever transducer 120-2) connecting to the housing 110, respectively, and three damping layers 130 (i.e., a first damping layer 130-1, a second damping layer 130-2, and a third damping layer 130-3). The first damping layer 130-1 may connect to the housing 110 at an end of the first damping layer 130-1 and connect to the first cantilever transducer 120-1 at the other end of the first damping layer 130-1. The second damping layer 130-2 may connect to each of the two cantilever transducers 120 and be disconnected to housing 110. The third damping layer 130-3 may connect to the housing 110 at an end of the third damping layer 130-3 and connect to the second cantilever transducers 120-2 at the other end of the third damping layer 130-3. Each of the two cantilever transducers 120 may be fixed to the housing 110 at an end (also referred to as "fixed end"). On this occasion, the vibration of the housing 110 may be transferred to each cantilever transducer 120 via the fixed end and thus cause each cantilever transducer 120 to vibrate to generate one or more electrical outputs.

The first damping layer 130-1 may cover part of an upper surface of the first cantilever transducer 120-1. The second damping layer 130-2 may cover part of a lower surface of the first cantilever transducer 120-1 and part of an upper surface of the second cantilever transducer 120-2. The third damping layer 130-3 may cover part of a lower surface of the second cantilever transducer 120-2. In some embodiments, each of the three damping layers may have a strip shape and stretch along an axial direction of the damping layer.

In some embodiments, the damping layers may be disposed on the transducers at the same or different angles. For example, as shown in FIG. 9A, each of the three damping layers may stretch along the up and down direction, which is also the vibration direction of the first cantilever transducer 120-1 and the second cantilever transducer 120-2. In another word, each of the three damping layers may be disposed on the first cantilever transducer 120-1 or the second cantilever transducer 120-2 at an angle of 90°. As another example, as shown in FIG. 9B, the first damping layer 130-1 may be disposed on the first cantilever transducer 120-1 at an angle between 60° and 90°. The second damping layer 130-2 may be disposed on the first cantilever transducer 120-1 or the second cantilever transducer 120-2 at an angle of 90°. The third damping layer 130-3 may be disposed on the second cantilever transducer 120-2 at an angle between 60° and 90°. As a still example, as shown in FIG. 9C, the first damping layer 130-1 may be disposed on the first cantilever transducer 120-1 at an angle between 60° and 90°. The second damping layer 130-2 may be disposed on the first cantilever transducer 120-1 and the second cantilever transducer 120-2 at an angle of 90°. The third damping layer 130-3 may be disposed on the second cantilever transducer 120-2 at an angle of 90°.

Figure 10A:
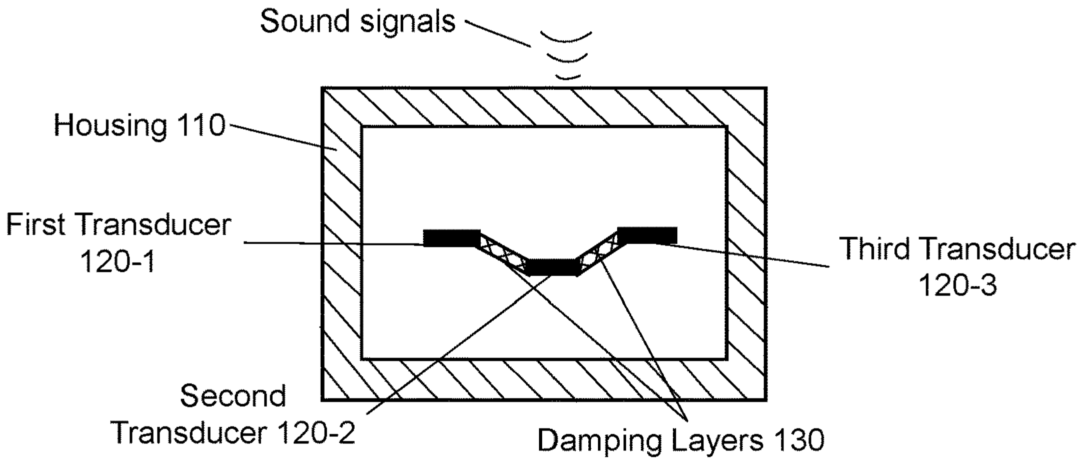
FIG. 10A is a structural schematic diagram illustrating an exemplary microphone according to some embodiments of the present disclosure.

FIG. 10A is a structural schematic diagram illustrating an exemplary microphone according to some embodiments of the present disclosure. As shown in FIG. 10A, the microphone 100 may include a housing 110, three transducers 120 (i.e., a first transducer 120-1, a second transducer 120-2, and a third transducer 120-3), and two damping layers 130. Each of the two damping layers 130 may connect to one transducer at one end and connect to another transducer at the other end. The three transducers 120 and the two damping layers 130 may form a similar "V" shape inside the housing 110. The two damping layers 130 or two of the three transducers 120 (i.e., the first transducer 120-1 and the third transducer 120-3) may be symmetrical with respect to a center line of the second transducer 120-2. The two damping layers 130 may not connect to the housing 110.

Figure 10B:
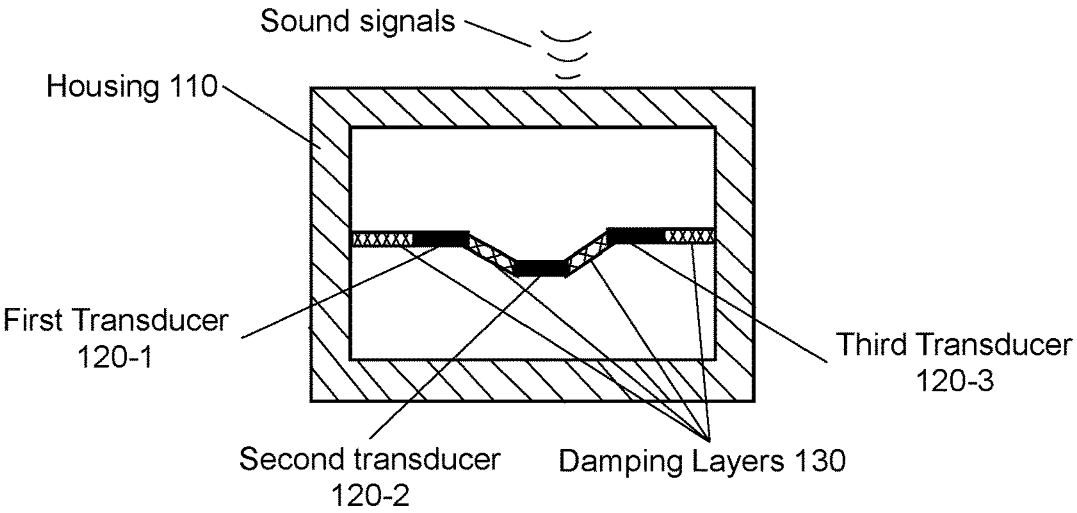
FIG. 10B is a structural schematic diagram illustrating an exemplary microphone according to some embodiments of the present disclosure.

FIG. 10B is a structural schematic diagram illustrating an exemplary microphone according to some embodiments of the present disclosure. As shown in FIG. 10B, the microphone 100 may include a housing 110, three transducers 120 (i.e., a first transducer 120-1, a second transducer 120-2, and a third transducer 120-3), and four damping layers 130. Each of the four damping layers 130 may connect to one transducer at one end and connect to another transducer or the housing 110 at the other end. The three transducers 120 and the four damping layers 130 may form a similar "V" shape inside the housing 110. Two of the four damping layers 130 or two of the three transducers 120 (i.e., the first transducer 120-1 and the third transducer 120-3) may be symmetrical with respect to a center line of the second transducer 120-2. Two of the four damping layers 130 may not connect to the housing 110, and the other two of the four damping layers 130 may connect to the housing, respectively.

Figure 10C:
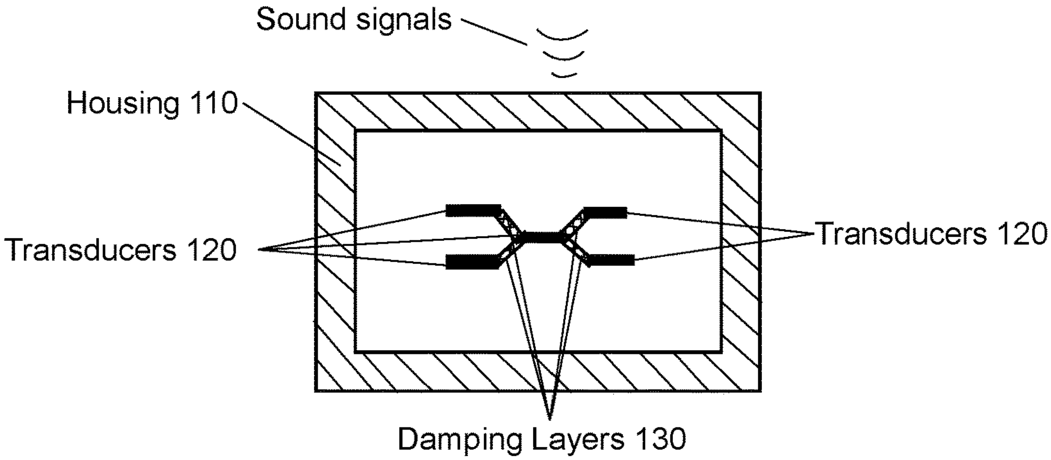
FIG. 10C is a structural schematic diagram illustrating an exemplary microphone according to some embodiments of the present disclosure.

FIG. 10C is a structural schematic diagram illustrating an exemplary microphone according to some embodiments of the present disclosure. As shown in FIG. 10C, the microphone 100 may include a housing 110, five transducers 120, and four damping layers 130. Each of the four damping layers 130 may connect to one transducer at one end and connect to another transducer at the other end. The five transducers 120 and the four damping layers 130 may form a similar "X" shape inside the housing 110. Two of the four damping layers 130 or two of the five transducers 120 may be symmetrical with respect to a center line of a transducer disposed on a central position among the five transducers 120. The four damping layers 130 may not connect to the housing 110.

Figure 10D:
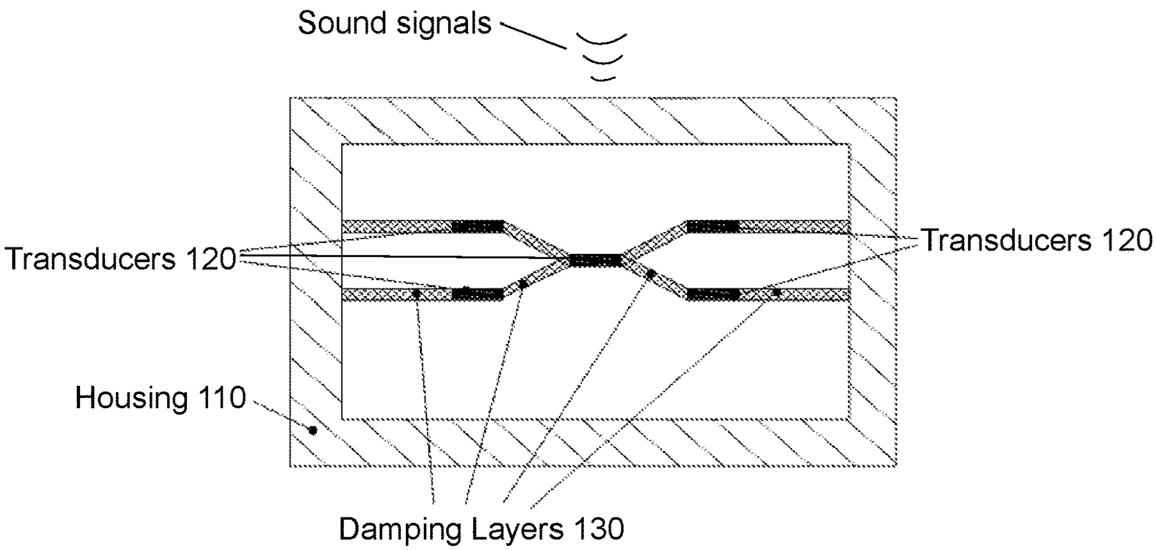
FIG. 10D is a structural schematic diagram illustrating an exemplary microphone according to some embodiments of the present disclosure.

FIG. 10D is a structural schematic diagram illustrating an exemplary microphone according to some embodiments of the present disclosure. As shown in FIG. 10D, the microphone 100 may include a housing 110, five transducers 120, and eight damping layers 130. Each of the eight damping layers 130 may connect to one transducer at one end and connect to another transducer or the housing 110 at the other end. The five transducers 120 and the eight damping layers 130 may form a similar "X" shape inside the housing 110. Two of the eight damping layers 130 or two of the five transducers 120 may be symmetrical with respect to a center line of a transducer disposed on a central position among the five transducers 120. Four of the eight damping layers 130 may not connect to the housing 110, and the other four of the eight damping layers 130 may connect to the housing, respectively.

As described in connection with the damping layer(s) in FIG. 3A-3B, the arrangement of the damping layer(s) in FIGS. 6A-6C, 7A-7C, 8, 9A-9C, and 10A-10D, may be configured to change a composite damping and/or a composite weight of the transducer(s) to adjust the frequency response curve of the microphone 100. The damping layer may transfer vibrations between the transducers to each other, thus the resonance peaks of the output transducer (or the microphone 100) may be moved toward the lower frequency zone, and the Q value of the output transducer at the resonance peak may be reduced. As such, the sensitivity of the output transducer (or the microphone 100) at a frequency band lower than the resonance frequency may be higher than the sensitivity of each transducer without connecting to any other transducers.

It should be noted that the exemplary microphones described in the present disclosure are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the housing 110 of the microphone 100 may include one or more openings to guide sound signals into the housing 110 to cause any transducer in the housing 110 to vibrate (e.g., when the microphone 110 is an air conduction microphone). In such case, the cantilever transducer above may be replaced with a diaphragm that is more sensitive to air vibration. As another example, the microphone 100 may include a housing 110, two transducers 120, and two damping layers 130. Each of the two damping layers 130 may connect to each of the two transducers 120 and be disconnected to the housing 110. One of the two damping layers 130 may completely cover a lower surface of each of the two transducers 120. The other of the two damping layers 130 may completely cover an upper surface of each of the two transducers 120. As a further example, the microphone 100 may include a housing 110 including at least two accommodation spaces, each of which may include at least two transducers connected via at least one damping layer. As still a further example, different damping layers may be made of the same or different materials. Each damping layer may be optionally connected to or disconnected to the housing. The count of the damping layers or the transducers may not be limited, and the positions of the damping layers with respect to the transducers may be adjusted according to practical needs.

Figure 11:
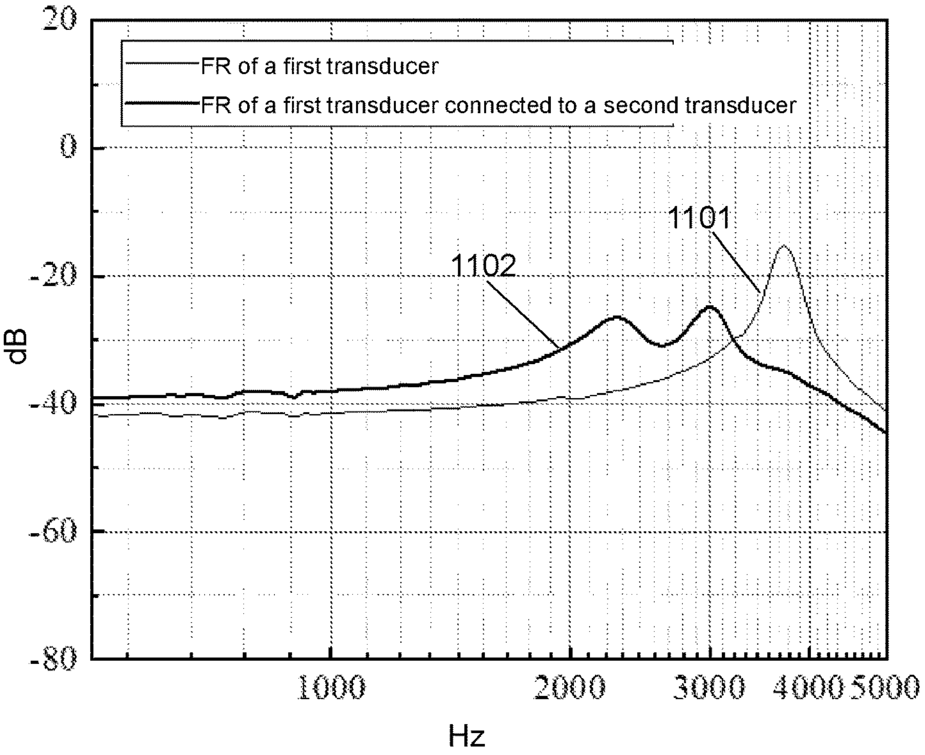
FIG. 11 is a schematic diagram illustrating an exemplary frequency response curve of a first transducer, and an exemplary frequency response curve of the first transducer connected to a second transducer via a damping layer according to some embodiments of the present disclosure.

FIG. 11 is a schematic diagram illustrating an exemplary frequency response curve of a first transducer, and an exemplary frequency response curve of the first transducer connected to a second transducer via a damping layer according to some embodiments of the present disclosure. As shown in FIG. 11, line 1101 represents the frequency response curve of the first transducer alone. Line 1102 represents the frequency response curve of the first transducer when it is connected to the second transducer via the damping layer. The first transducer connected to the second transducer herein may be the output transducer. The damping layer may transfer vibration signals between the first transducer and the second transducer. The frequency response curve of the output transducer (i.e., line 1102) may have two resonance peaks each of which corresponds to a resonance peak of the first transducer or the second transducer. Due to the damping layer, the resonance peaks of the first transducer and the second transducer are moved toward the lower frequency zone, and the Q value of the output transducer at the resonance peak may be smaller than that of the first transducer. As such, the sensitivity of the output transducer at a frequency band from, e.g., 100 Hz to 3000 Hz or from 100 Hz to 2250 Hz, may be higher than the sensitivity of the first transducer without connecting to the second transducer.

Figure 12A:
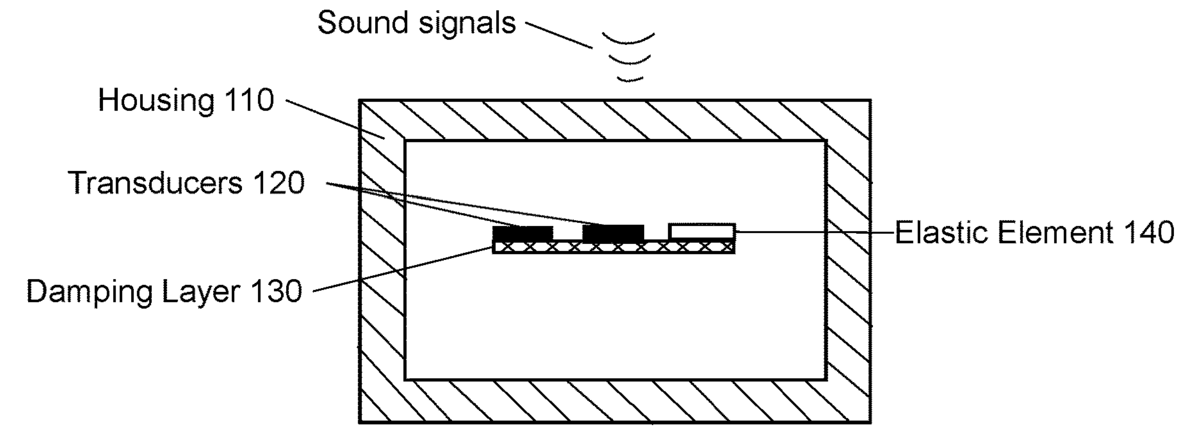
FIG. 12A is a structural schematic diagram illustrating an exemplary microphone according to some embodiments of the present disclosure.

FIG. 12A is a structural schematic diagram illustrating an exemplary microphone according to some embodiments of the present disclosure. As shown in FIG. 12A, the microphone 100 may include a housing 110, two transducers 120, an elastic element 140, and a damping layer 130 connected to each of the two transducers 120 and the elastic element 140, respectively, and disconnected to the housing 110. The two transducers 120 and the elastic element 140 may be disposed on a same side of the damping layer 130. The damping layer 130 may cover a lower surface of each of the two transducers 120 and the elastic element 140. The elastic element 140 may vibrate in response to, for example, the air vibration in the housing 110, transferring its vibration to the damping layer 130 and further to the two transducers 120. When one of the two transducers 120 is selected as the output transducer, the vibrations of the elastic element 140 and the other one of the two transducers 120 may provide two distinctive resonance peaks to the output transducer. Therefore, the sensitivity of the output transducer may be improved. Additionally, the damping layer 130 may help reduce the Q value of the output transducer, thus making the frequency response of the microphone flatter.

Figure 12B:
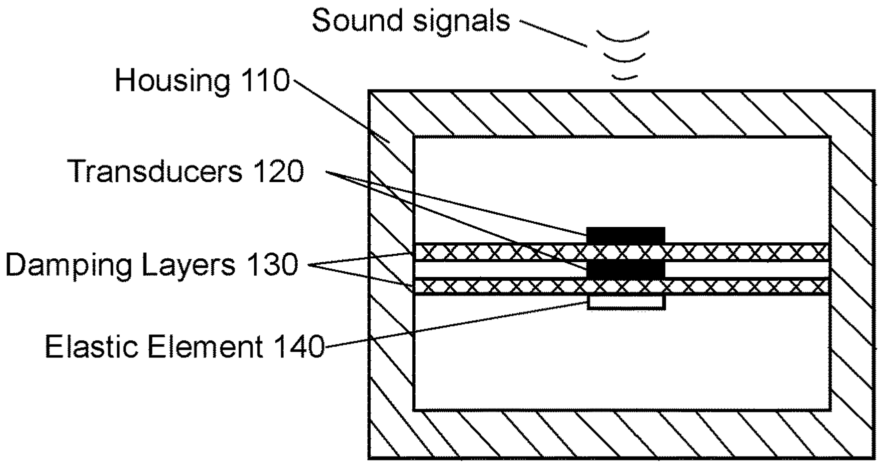
FIG. 12B is a structural schematic diagram illustrating an exemplary microphone according to some embodiments of the present disclosure.

FIG. 12B is a structural schematic diagram illustrating an exemplary microphone according to some embodiments of the present disclosure. As shown in FIG. 12B, the microphone 100 may include a housing 110, two transducers 120, two damping layers 130, and an elastic element 140. Each of the two damping layers 130 may connect to the housing 110 at two ends of each of the two damping layers 130. The two transducers 120, the elastic element 140, and the damping layer 130 may form a sandwich structure. The One of the two damping layers 130 may cover a lower surface of one of the two transducers 120 and an upper surface of the other of the two transducers 120. The other of the two damping layers 130 may cover a lower surface of the other of the two transducers 120 and an upper surface of the elastic element 140.

Figure 12C:
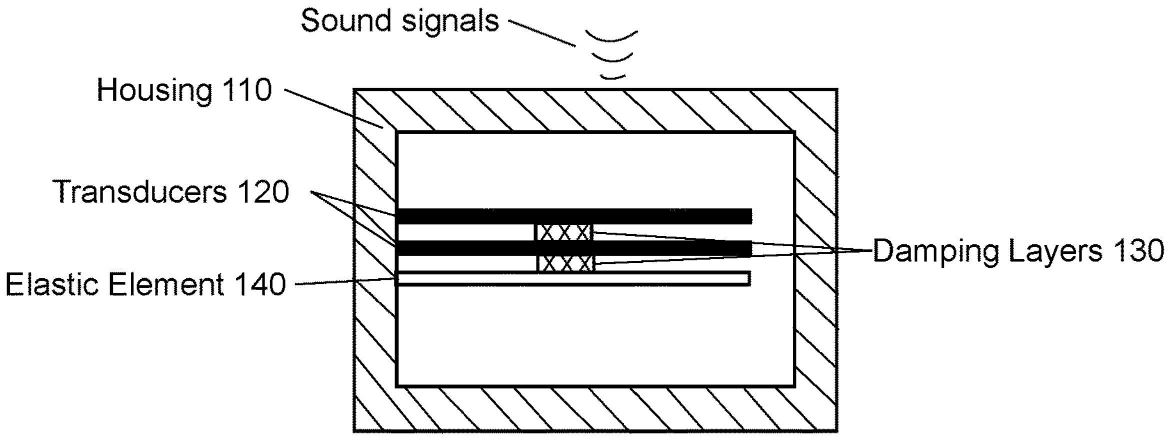
FIG. 12C is a structural schematic diagram illustrating an exemplary microphone according to some embodiments of the present disclosure.

FIG. 12C is a structural schematic diagram illustrating an exemplary microphone according to some embodiments of the present disclosure. As shown in FIG. 12C, the microphone 100 may include a housing 110, two cantilever transducers 120, two damping layers 130, and an elastic element 140. Each of the two damping layers 130 may not connect to the housing 110. The cantilever transducer or the elastic element may be fixed to the housing 110 at an end. The two cantilever transducers 120, the elastic element 140, and the damping layer 130 may form a sandwich structure. One of the two damping layers 130 may cover a lower surface of one of the two cantilever transducers 120 and an upper surface of the other of the two cantilever transducers 120. The other of the two damping layers 130 may cover a lower surface of the other of the two cantilever transducers 120 and an upper surface of the elastic element 140. Each of the two damping layers 130 may sandwich between the two cantilever transducers 120 and/or the elastic element 140.

Figure 12D:
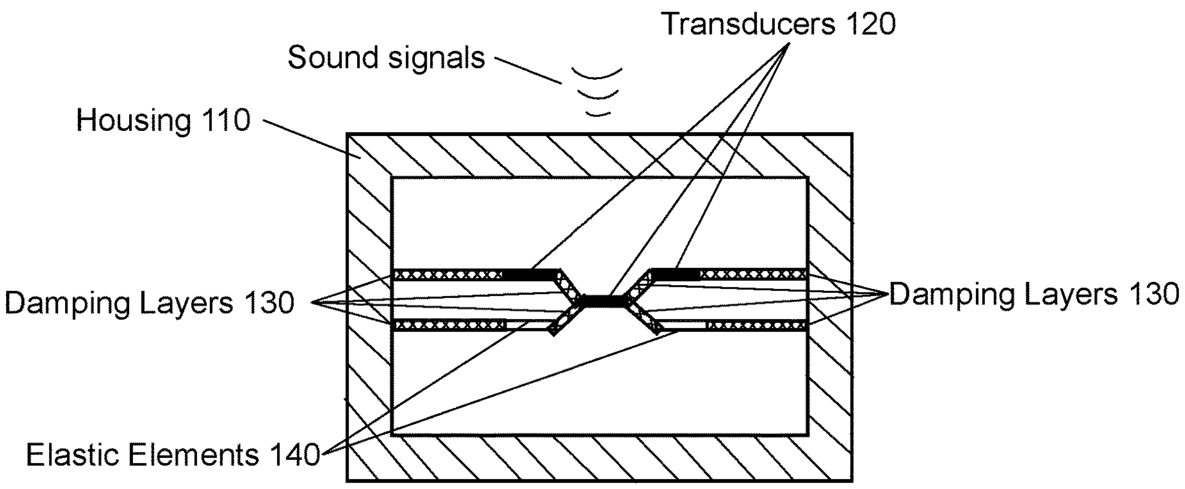
FIG. 12D is a structural schematic diagram illustrating an exemplary microphone according to some embodiments of the present disclosure.

FIG. 12D is a structural schematic diagram illustrating an exemplary microphone according to some embodiments of the present disclosure. As shown in FIG. 12D, the microphone 100 may include a housing 110, three transducers 120, eight damping layers 130, and two elastic elements 140. Each of the eight damping layers 130 may connect to one transducer or one elastic element at an end, and connect to another transducer or the housing 110 at the other end. The three transducers 120, the two elastic elements 140, and the eight damping layers 130 may form a similar "X" shape inside the housing 110. Two of the eight damping layers 130, two of the three transducers 120, or the two elastic elements 140 may be symmetrical with respect to a center line of a transducer disposed on a central position among the transducer(s) 120 and/or the elastic element(s) 140. Four of the eight damping layers 130 may not connect to the housing 110, and the other four of the eight damping layers 130 may connect to the housing, respectively.

It should be noted that the exemplary microphones described in the present disclosure are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the housing 110 of the microphone 100 may include one or more openings to guide sound signals into the housing 110 to cause any transducer in the housing 110 to vibrate (e.g., when the microphone 110 is an air conduction microphone). In such case, the transducer described above may be replaced with a diaphragm that is more sensitive to air vibration. As another example, the microphone 100 may include a housing 110, two transducers 120, an elastic element 140, and a damping layer 130 connected to each of the two transducers 120 and the elastic element 140, respectively, and disconnected to the housing 110. The damping layer 130 may cover an upper surface of each of the two transducers 120 and the elastic element 140. As a further example, the microphone 100 may include a housing 110 including at least two accommodation spaces, at least one of which may include at least two transducers and at least one elastic element connected via at least one damping layer. As still a further example, different damping layers may be made of the same or different materials, and the types of transducers may be the same or different. Each damping layer may be optionally connected to or disconnected to the housing. The count of the damping layers, the transducers, or the elastic elements may not be limited, and the positions of damping layers with respect to the transducers and/or the elastic elements may be adjusted according to practical needs.

Figure 13:
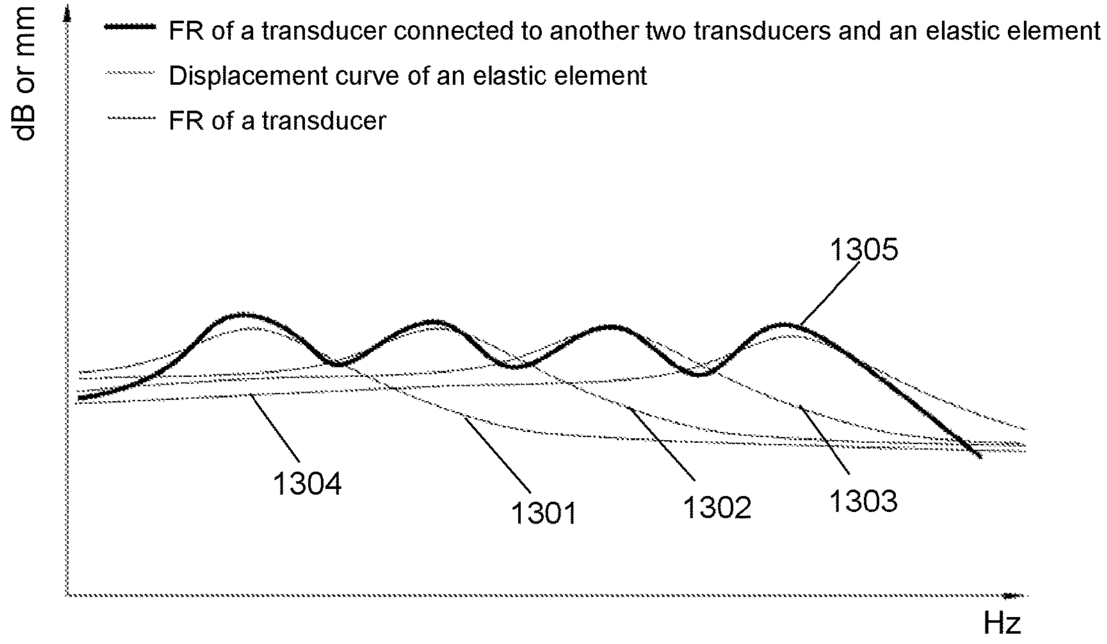
FIG. 13 is a schematic diagram illustrating exemplary frequency response curves of a first transducer, a second transducer, and a third transducer, an exemplary displacement curve of an elastic element, and an exemplary frequency response curve of the first transducer connected to the second transducer, the third transducer, and the elastic element via three damping layers, respectively, according to some embodiments of the present disclosure.

FIG. 13 is a schematic diagram illustrating exemplary frequency response curves of a first transducer, a second transducer, and a third transducer, an exemplary displacement curve of an elastic element, and an exemplary frequency response curve of the first transducer connected to the second transducer, the third transducer, and the elastic element via three damping layers, respectively, according to some embodiments of the present disclosure. As shown in FIG. 13, lines 1301, 1302, and 1303 represent frequency response curves of the first transducer, the second transducer, and the third transducer, respectively. Line 1304 represents the displacement curve of the elastic element. Line 1305 represents the frequency response curve of the first transducer when it is connected to the second transducer, the third transducer, and the elastic element. The first transducer connected to the second transducer, the third transducer, and the elastic element herein may be the output transducer. In some embodiments, another transducer except the first transducer may also act as an output transducer. The damping layers may transfer vibration signals between the transducer and the elastic element. The frequency response curve of the output transducer (i.e., line 1305) may have four resonance peaks each of which corresponds to a resonance peak of each transducer or the elastic element (i.e., lines 1301, 1302, 1303, or 1304). Due to the damping layer, the resonance peaks of each transducer and the elastic element are moved toward the lower frequency zone, and the Q value of the output transducer at the resonance peak may be smaller than that of the first transducer. As such, the sensitivity of the output transducer (represented by line 1305) may be higher than the sensitivity of any one of the three transducers alone (represented by lines 1301, 1302, or 1303).

According to FIG. 13, the count of transducers and/or elastic elements connected in series may affect the frequency response curve of the output transducer. The more transducers and/or elastic elements connected in series, the flatter the frequency response curve of the output transducer.

Figure 14:
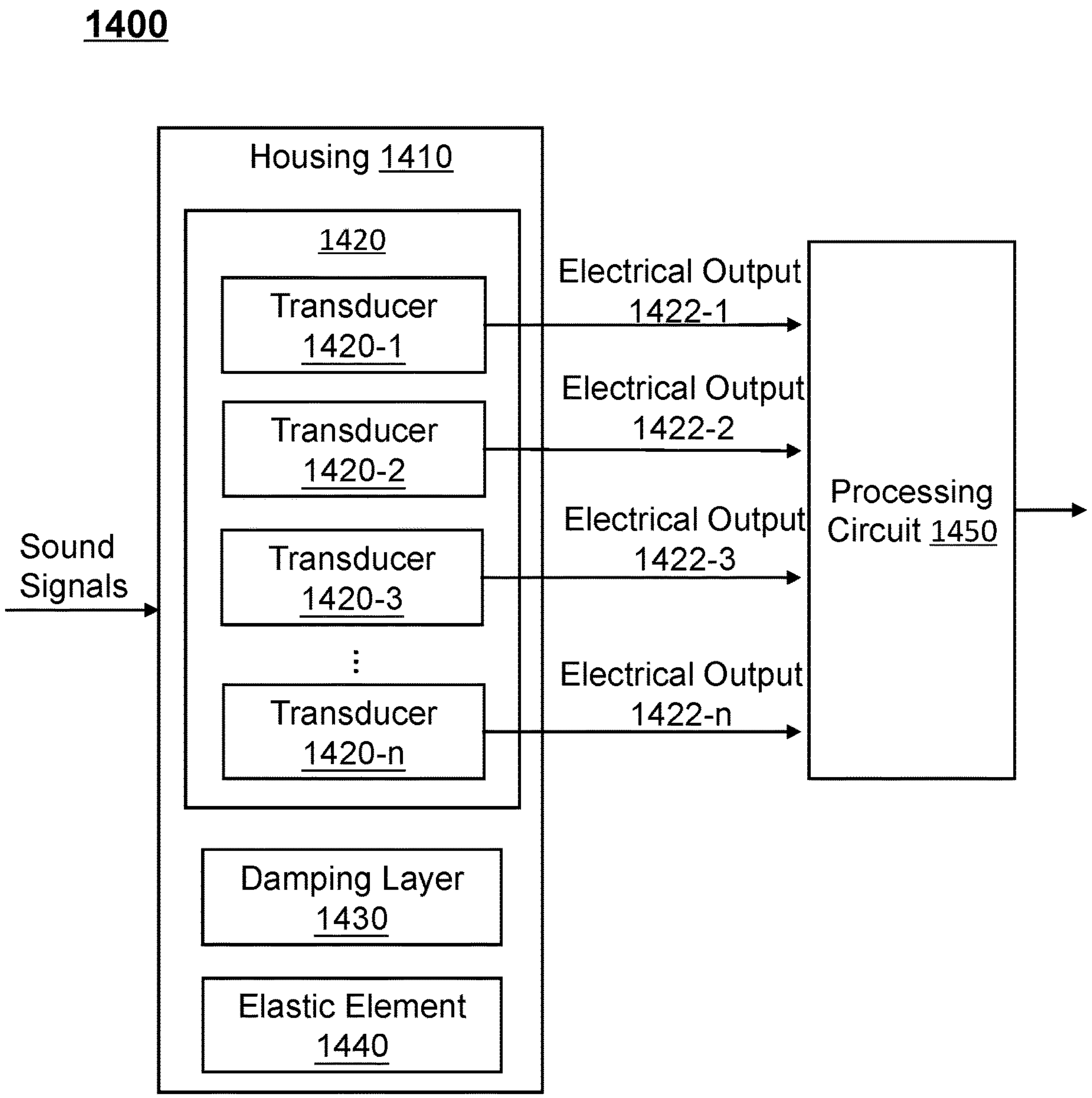
FIG. 14 is a block diagram illustrating an exemplary microphone according to some embodiments of the present disclosure.

FIG. 14 is a block diagram illustrating an exemplary microphone according to some embodiments of the present disclosure. For example, a microphone 1400 may be a microphone of an electronic device, such as a telephone, an earphone, a headphone, a wearable device, a smart mobile device, a virtual reality device, an augmented reality device, a computer, a laptop, etc. The microphone 1400 may include a housing 1410, at least two transducers 1420 (e.g., a transducer 1420-1, a transducer 1420-2, a transducer 1420-3, . . . , a transducer **1420-*n*), and a processing circuit 1450**.

The housing 1410 may refer to the housing 110 described in FIG. 1. For example, the housing may receive sound signals by contacting or not contacting with a sound source.

Each of the at least two transducers 1420 may be configured to vibrate to output an electrical output in response to the sound signals and/or transfer vibrations to other transducer(s) via the damping layer(s). For example, the sound signals may be transmitted from the housing 1410 and deform the at least two transducers 1420 to generate electrical signals. The electrical signals may include two or more electrical outputs of the at least two transducers 1420. Each electrical output may be outputted from one transducer.

In some embodiments, a damping layer may be disposed on one transducer to change a composite damping and/or a composite weight of the transducer, thereby adjusting the Q value and a frequency response of the transducer. In some embodiments, two or more transducers (e.g., the transducer 1420-1 and 1420-2) may be connected to each other by at least one damping layer 1430. The at least one damping layer 1430 may also change a composite damping and/or a composite weight of each of the interconnected transducers, thereby adjusting the Q value and a frequency response of each transducer. Among the interconnected transducers, each transducer may receive sound signals via the housing 1410 and vibrations from other transducers via the at least one damping layer 1430, concurrently. As a result, the frequency response curve of each of the interconnected transducers may include at least two resonance peaks. More descriptions regarding the at least one damping layer 1430 and a relationship between the damping layer(s) and the transducer(s) may be found elsewhere in the present disclosure (e.g., FIG. 1 and the descriptions thereof). For example, the at least one damping layer 1430 may be disposed on at least one surface of each of the at least two transducers 1420 at a predetermined angle (e.g., 10°, 15°, 30°, 45°, 60°, 70°, 90°, etc.). As another example, the connection between any two of the at least two transducers 1420 via the at least one damping layer 1430 may include bonding, riveting, thread connection, integral forming, suction connection, or the like, or any combination thereof.

In some embodiments, the microphone 1400 may further include one or more elastic element 1440. The elastic element(s) may be configured to vibrate in response to the sound signals and transmit the vibrations to its connected transducer(s) via one or more damping layers. In some embodiments, each transducer may be connected with an elastic element via a damping layer, such as the microphone 1400 as illustrated in FIG. 20C. In some embodiments, part of the transducers may be connected to the elastic elements, and the other part may be connected to the damping layer(s) only or be disconnected with any damping layer. In some embodiments, the transducers, the damping layer(s), and the elastic element(s) may be connected in series, such as the microphone 1400 as illustrated in FIG. 20B. More descriptions about the elastic element(s) may be found in elsewhere in the present disclosure (e.g., FIG. 1 and the descriptions thereof).

In some embodiments, each transducer (e.g., transducers 1420-1, 1420-2, 1420-3) may act as an output transducer to output an electrical output to the processing circuit 1450. As shown in FIG. 14, the transducers 1420-1, 1420-2, 1420-3, . . . , may output electrical outputs 1422-1, 1422-2, 1422-3, . . . , to the processing circuit 1450, respectively. Alternatively, part of the at least two transducers 1420 may be the output transducers that output electrical outputs, and the other part of the at least two transducers 1420 may merely transfer vibrations to the output transducers they connect.

In some embodiments, considering that the two or more electrical outputs may be out of phase due to different frequency characteristics of the transducers generating the electrical outputs, phases of the two or more electrical outputs of the at least two transducers 1420 may be adjusted before the two or more electrical outputs are combined. For example, the phases of the two or more electrical outputs may be adjusted by the processing circuit 1450 according to a phase adjustment operation. When a specific transducer is connected in a microphone circuit, the phase of an electrical output of the specific transducer may be reversed by the processing circuit 1450 before the electrical output is further processed. In other words, the phase processing mode of the specific transducer may be different from other transducers. Taking two output transducers which are independently arranged (e.g., the transducers in FIGS. 18A-18D) as an example, each of the two output transducers may output an electrical output. According to the phase adjustment operation described above, the phase of one electrical output may be reversed and the phase of the other electrical output may be maintained, which may be referred to as a Positive-Negative-Negative-Positive (PNNP) processing mode. Additionally or alternatively, a damping layer may be added to each independently arranged transducer (e.g., the transducers in FIG. 20D) to reduce the Q value of each transducer.

In some embodiments, one or more additional transducers that do not output electrical signals and/or one or more elastic elements may also be connected to at least one of the independently arranged transducers (e.g., the transducers in FIG. 20C) to increase the resonance peaks of the microphone. In the case that resonance frequencies provided by the independently arranged transducers do not cross each other, the phase of one electrical output may be reversed and the phase of the other electrical output may be maintained. As described herein, that the resonance frequencies provided by the independently arranged transducers do not cross each other refers that the largest resonance frequency provided by one of the independently arranged transducers and its connected transducer is smaller than the smallest resonance frequency of the other one of the independently arranged transducers and its connected transducer. In this way, by adjusting the phases of different electrical outputs derived from different output transducers, it may avoid an undesirable reduction in signal strength of the electrical signals due to cancellation of the two or more electrical outputs when combined. In some embodiments, the two or more electrical outputs may be of adjacent transducers among the at least two transducers 1420 which are sorted in a descending order or an ascending order according to their frequency frequencies.

In some embodiments, when at least two output transducers 1420 are connected to each other via one or more damping layers (e.g., the transducers in FIGS. 20A-20B), each electrical output generated from each transducer of the at least two transducers may have a same count of resonance peaks (e.g., each having at least two resonance peaks). The processing circuit 1450 may obtain the electrical signals representing the sound signals by directly superimposing the electrical outputs of the at least two transducers, without reversing the phase of any of the two electrical outputs, which may be referred to as a Positive-Negative-Positive (PNP) processing mode. More descriptions for processing the electrical signals may be found elsewhere in the present disclosure (e.g., FIGS. 15A-15C, and 16A-16B and the descriptions thereof).

It should be noted that the above descriptions of the microphone 1400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more of the at least two transducers 1420 may be connected to one or more elastic elements.

Figure 15A:
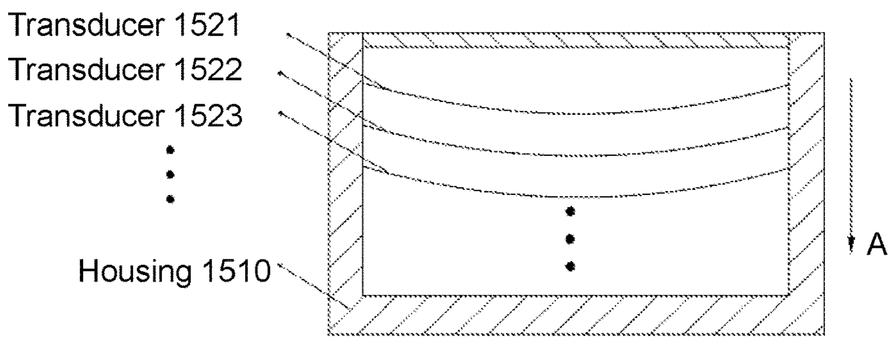
FIG. 15A is a schematic diagram illustrating vibration states of transducers of a microphone working at a first frequency less than a first-order resonance frequency of the microphone according to some embodiments of the present disclosure.
Figure 15B:
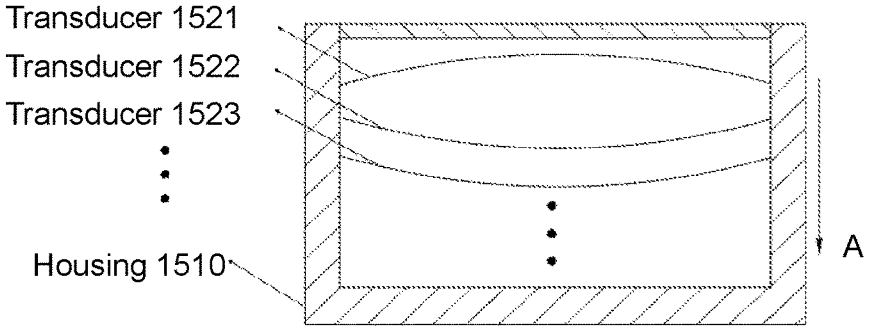
FIG. 15B is a schematic diagram illustrating vibration states of transducers of a microphone working at a second frequency greater than a first-order resonance frequency and less than a second-order resonance frequency of the microphone according to some embodiments of the present disclosure.

FIG. 15A is a schematic diagram illustrating vibration states of transducers of a microphone working at a first frequency less than a first-order resonance frequency of the microphone according to some embodiments of the present disclosure. FIG. 15B is a schematic diagram illustrating vibration states of transducers of a microphone working at a second frequency greater than a first-order resonance frequency and less than a second-order resonance frequency of the microphone according to some embodiments of the present disclosure. For illustration purposes, a bone conduction microphone is taken as an example for illustrating the different vibration states of transducers. As shown in FIGS. 15A and 15B, arrow A refers to a vibration direction of the housing of the microphone (e.g., the microphone 1400). The transducers 1521, 1522, 1523, . . . , may each be independently fixed to the housing. For convenience, the transducers 1521, 1522, 1523, . . . , may be sorted in an ascending order according to their resonance frequencies. That is, the transducer 1521 may have the smallest resonance frequency, the transducer 1522 may have the second smallest resonance frequency, and so on. For brevity, the resonance frequency of the transducer 1521 may be also referred to as the first-order resonance frequency of the microphone, the resonance frequency of the transducer 1522 may be also referred to as the second-order resonance frequency of the microphone, and so on.

Each transducer (e.g., the transducer 1521, 1522, or 1523) may receive sound signals from the housing 1510 and vibrate to generate an electrical output. Generally, the phase of an electrical output from a specific transducer may be related to a vibration state of the specific transducer. For example, different vibration directions of the specific transducer with respect to the vibration direction of the housing may lead to different phases of the electrical output generated by the specific transducer. As another example, different vibration displacements (or deformation degrees) of the specific transducer may cause different strengths of the electrical output generated by the specific transducer.

In order to understand a relationship between the vibration state and the electrical output of the specific transducer, the vibration direction of the housing 1510 may be used as a reference. Specifically, if the vibration direction of the specific transducer is the same as that of the housing 1510, the phase (denoted as θ) of the electrical output of the specific transducer may be regarded as 0°. If the vibration direction of the specific transducer is opposite to that of the housing 1510, the phase of the electrical output of the specific transducer may be as 180°.

When the microphone works at a first frequency less than the first-order resonance frequency of the microphone, as illustrated in FIG. 15A, each transducer may have a vibration direction same as that of the housing 1510 (i.e., the deformation direction of each transducer is also in the direction of arrow A illustrated in FIG. 15A). In this case, the electrical output of each transducer may have the same phase, which may be denoted as θ=0°. However, when the microphone works at a second frequency greater than the first-order resonance frequency and less than the second-order resonance frequency of the microphone, as illustrated in FIG. 15B, the vibration direction of the transducer 1521 may be opposite to the vibration direction of the housing 1510, and the vibration direction of each of the rest transducers (e.g., the transducer 1522, 1523, etc.) may be the same as that of the housing 1510. In this case, the electrical output of the transducer 1521 may have an opposite phase to the rest of the transducers. That is, the phase of the electrical output of the transducer 1521 may be denoted as θ=180°, and the phase of the electrical output of each of the rest transducers may be denoted as θ=0°.

For illustration purposes, the electrical outputs of the transducers 1521 and 1522 may be taken as examples. The superposition of the electrical output of the transducer 1521 ("first electrical output" for brevity) and the electrical output of the transducer 1522 ("second electrical output" for brevity) may be determined according to Equations (6-8) as follows:

$$u_1 = U_1 \cos\theta_1, \tag{6}$$

$$u_2 = U_2 \cos\theta_2, \tag{7}$$

$$u = |u_1 + u_2| = |U_1 \cos\theta_1 + U_2 \cos\theta_2|, \tag{8}$$

where $u_1$ denotes the first electrical output, $u_2$ denotes the second electrical output, $U_1$ denotes a first amplitude of the first electrical output, $U_2$ denotes a second amplitude of the second electrical output, $\theta_1$ denotes a first phase of the first electrical output, $\theta_2$ denotes a second phase of the second electrical output, and u denotes the amplitude of a total signal of the first electrical output and the second electrical output.

When the microphone works at the first frequency, the first phase may be the same as the second phase, i.e., $\theta_1=\theta_2=0°$, thus $u=|u_1+u_2|=|U_1+U_2|$. When the microphone works at the second frequency, the first phase may be opposite to the second phase, i.e., $\theta_1=180°$ and $\theta_2=0°$, thus $u=|u_1+u_2|=|U_2-U_1|$. As such, if the first electrical output of the transducer 1521 and the second electrical output of the transducer 1522 are directly superimposed (i.e., using the PNP processing mode), a total frequency response curve of the microphone may form a deep valley between resonance peaks of the transducers 1521 and 1522 (i.e., a total signal of the first electrical output and the second electrical output at the valley may be smaller than one of the first electrical output and the second electrical output), making the total frequency response curve of the microphone more uneven, e.g., as illustrated in FIG. 15C.

Figure 15C:
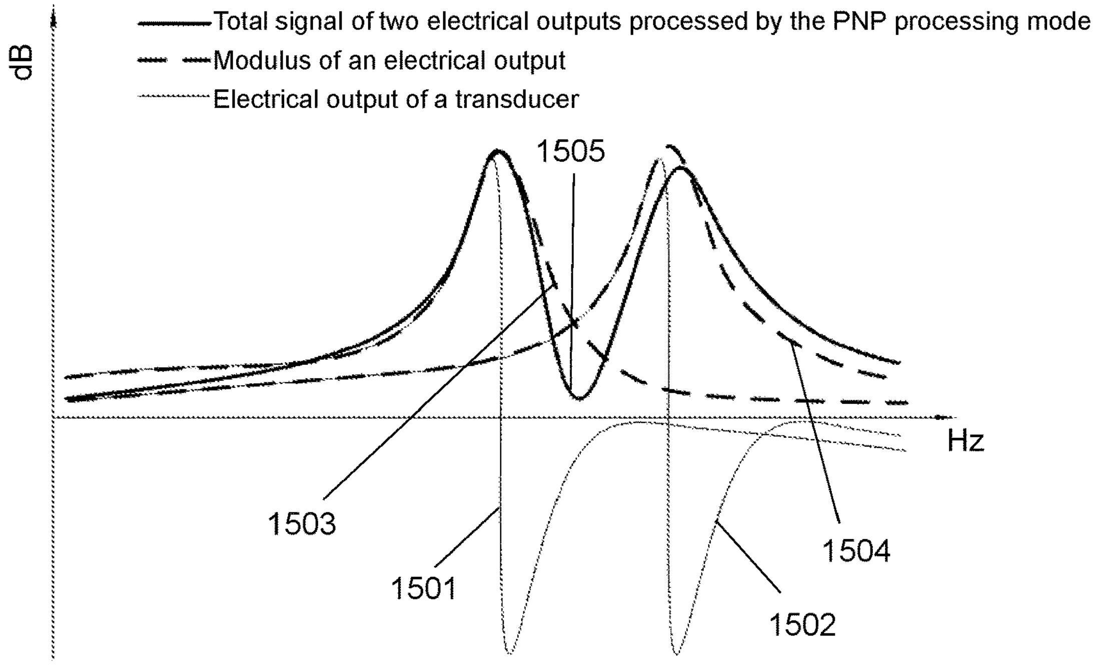
FIG. 15C is a schematic diagram illustrating exemplary curves each of which represents a relationship between an electrical output of a transducer and a frequency, exemplary curves each of which represents a relationship between the modulus of the electrical output and the frequency, and a curve representing a relationship between a total signal of the electrical output and the frequency according to some embodiments of the present disclosure.

FIG. 15C is a schematic diagram illustrating exemplary curves each of which represents a relationship between an electrical output of a transducer and a frequency, exemplary curves each of which represents a relationship between the modulus of the electrical output and the frequency, and a curve representing a relationship between a total signal of the electrical output and the frequency according to some embodiments of the present disclosure. As shown in FIG. 15C, each of lines 1501 and 1502 represents a curve representing a relationship between the electrical output of a transducer and a frequency. Each of lines 1503 and 1504 represents a curve representing a relationship between the modulus the electrical output and the frequency, which may also be referred to as a frequency response curve of the transducer. Line 1505 represents the curve representing a relationship between the total signal of the electrical outputs of two transducers and the frequency, which may also be referred to as a total frequency response curve of a microphone including the two transducers. The two transducers of the microphone may not connect to each other via any damping layer. The total frequency response curve may be obtained by directly superimposing the electrical outputs (i.e., using the PNP processing mode). According to FIG. 15C, the phase of an electrical output of a certain transducer may be changed by 180° when the vibration frequency shifts from a frequency lower than the resonance frequency of the certain transducer to a frequency higher than the that resonance frequency (see, lines 1501 and 1502). Each of the two transducers may provide a distinctive resonance peak to the total frequency response curve. Due to the deep valley between the two resonance frequencies of the two transducers, the sensitivity of the microphone between resonance peaks of the two transducers (represented by line 1505) may be lower than the sensitivity of any one of the two transducers (represented by lines 1503 or 1504). As a result, by simply superimposing electrical outputs of at least two transducers directly, a relatively deep valley may be formed between any two adjacent resonance frequencies of a microphone including the at least two transducers, resulting in an uneven frequency response curve of the microphone, which seriously affects the performance of the microphone.

Figure 15D:
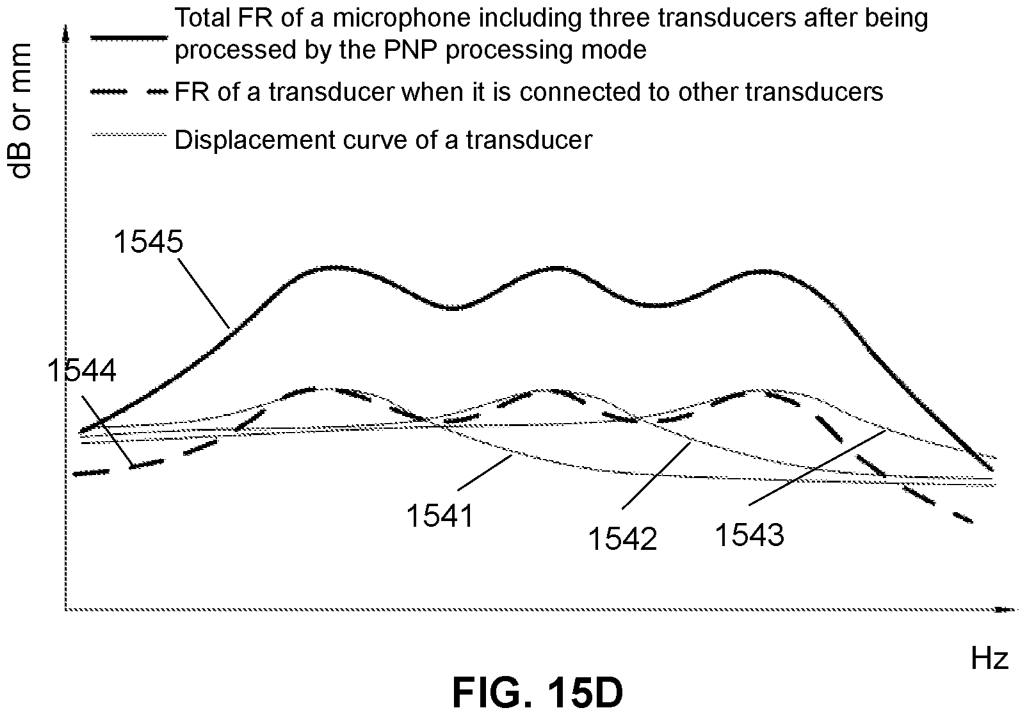
FIG. 15D is a schematic diagram illustrating exemplary displacement curves of three transducers, an exemplary frequency response curve of a transducer connected to the other two transducers, and a total frequency response curve of a microphone including the three transducers according to some embodiments of the present disclosure.

FIG. 15D is a schematic diagram illustrating exemplary displacement curves of three transducers, an exemplary frequency response curve of a transducer connected to the other two transducers, and a total frequency response curve of a microphone including the three transducers according to some embodiments of the present disclosure. As shown in FIG. 15D, lines 1541, 1542, and 1543 represent the displacement curves of the three transducers (e.g., a first transducer, a second transducer, and a third transducer), respectively. Line 1544 represents the frequency response curve of a transducer when it is connected to the other two transducers. Line 1545 represents the total frequency response curve of the microphone including the three transducers. The three transducers of the microphone may be physically connected to each other via at least one damping layer. Each transducer herein may act as an output transducer to output an electrical output to a processing circuit. Due to the damping layer(s), each transducer may transfer vibrations to the other transducers and thus provide a resonance peak to each of the other transducers. In this way, each transducer may output an electrical output having three resonance peaks (e.g., represented by line 1544) each of which corresponds to one of the three transducers (e.g., represented by lines 1541, 1542, or 1543). A processing circuit may process the electrical outputs of the three transducers using the PNP processing mode to obtain a total signal corresponding to the total frequency response curve of the microphone (i.e., line 1545). However, due to the phases of the electrical outputs, a relatively deep valley may be formed between any two adjacent resonance frequencies of the microphone as described in FIGS. 15A to 15C. Therefore, in order to obtain a relatively flat total frequency response curve, the composite damping of each of the three transducers may be adjusted by one or more additional damping layers so that the Q value of each transducer may be significantly reduced. As a result, the sensitivity of the microphone may be improved, and the total frequency response curve of the microphone may be flatter.

Figure 15E:
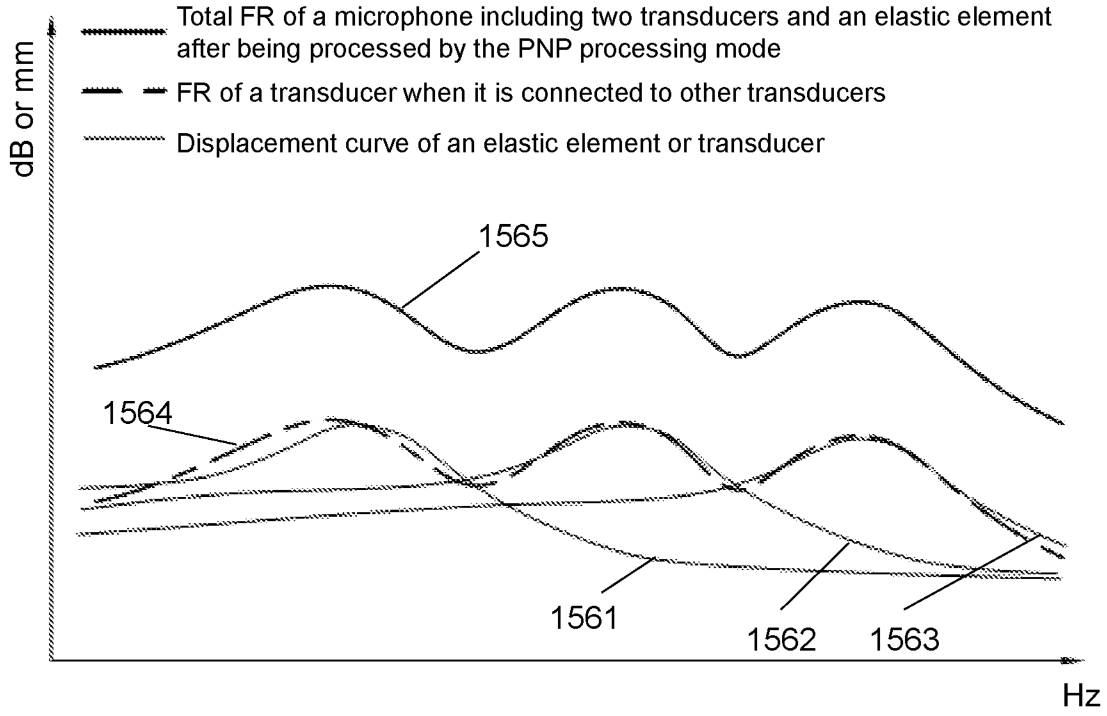
FIG. 15E is a schematic diagram illustrating exemplary displacement curves of an elastic element or two transducers, an exemplary frequency response curve of a transducer connected to the other transducer and the elastic element, and a total frequency response curve of a microphone including the two transducers and the elastic element according to some embodiments of the present disclosure.

FIG. 15E is a schematic diagram illustrating exemplary displacement curves of an elastic element or two transducers, an exemplary frequency response curve of a transducer connected to the other transducer and the elastic element, and a total frequency response curve of a microphone including the two transducers and the elastic element according to some embodiments of the present disclosure. As shown in FIG. 15E, lines 1561, 1562, and 1563 represent the displacement curves of the two transducers (e.g., a first transducer and a second transducer), and the elastic element, respectively. Line 1564 represents the frequency response curve of a transducer when it is connected to the other transducer and the elastic element. Line 1565 represents the total frequency response curve of the microphone including the two transducers and the elastic element. The two transducers and the elastic element of the microphone may be physically connected to each other via at least one damping layer. Each transducer herein may act as an output transducer to output an electrical output to a processing circuit. Due to the damping layer(s), each transducer and the elastic element may transfer vibrations to the other transducer (i.e., the output transducer) and thus provide resonance peaks to the output transducer. In this way, each output transducer may output an electrical output having three resonance peaks (e.g., represented by line 1564) each of which corresponds to one of the two transducers and the elastic element (e.g., represented by lines 1561, 1562, or 1563). As a result, the sensitivity of the total frequency response curve (i.e., line 1565) can be improved by directly superimposing the electrical outputs by a processing circuit (i.e., using the PNP processing mode).

In some embodiments, in order to make the valley between any two adjacent resonance frequencies of the microphone shallow, one or more damping layers may be added to each transducer and/or the elastic element to adjust its composite damping. The one or more damping layers may reduce the Q value of each transducer and/or the elastic element, resulting in a further flat total frequency response curve. In some alternative embodiments, the composite damping of each transducer and/or the elastic element may be adjusted by the one or more damping layers to cause the Q value of each transducer and/or the elastic element relatively high, and as a result, the resonance peaks of the microphone may be sharp. In addition, resonance frequencies of the microphone may be designed according to practical needs, to provide an appropriate frequency interval between two adjacent resonance frequencies of the microphone. A total signal corresponding to the total frequency response curve may further be processed by a processing circuit to improve the performance of the microphone as described in connection with FIG. 15F.

Figure 15F:
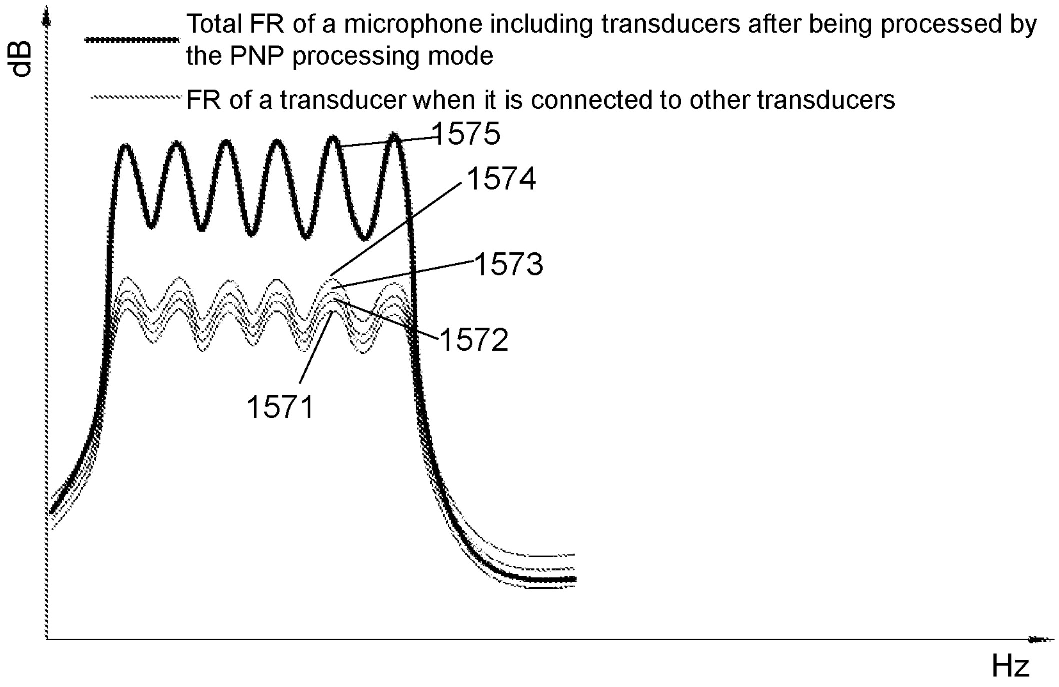
FIG. 15F is a schematic diagram illustrating exemplary frequency response curves of multiple transducers connected to each other via one or more damping layers, and a total frequency response curve of a microphone including the multiple transducers according to some embodiments of the present disclosure.

FIG. 15F is a schematic diagram illustrating exemplary frequency response curves of multiple transducers connected to each other via one or more damping layers, and a total frequency response curve of a microphone including the multiple transducers according to some embodiments of the present disclosure. As shown in FIG. 15F, each of lines 1571, 1572, 1573, and 1574 represents a frequency response curve of a single transducer (i.e., an output transducer) when it is connected to one or more other transducers. Line 1575 represents the total frequency response curve of the microphone including the multiple transducers. The multiple transducers of the microphone may be connected to each other via one or more damping layers. Each of the multiple transducers herein may act as an output transducer to output an electrical output to a processing circuit. The total frequency response curve of the microphone may be obtained by directly superimposing the electrical outputs of the multiple transducers (i.e., using the PNP processing mode). According to FIG. 15F, lines 1571, 1572, 1573, 1574, and 1575 have the same count or number of resonance peaks. Each resonance peak may correspond to a single transducer. In some embodiments, a composite damping of each of the multiple transducers may be adjusted by one or more additional damping layers to cause the Q value of each of the multiple transducers relatively high, and as a result, the resonance peaks of the microphone may be sharp. In addition, resonance frequencies of the multiple transducers may be designed according to practical needs, to provide an appropriate frequency interval between two adjacent resonance frequencies of the microphone. For example, if a voice to be collected is mainly in a specific frequency band of 500 Hz to 3000 Hz, more transducers with resonance frequencies in the specific frequency band may be set accordingly, that is, to make the frequency interval of two adjacent resonance frequencies in the specific frequency band relatively small. In such a case, a total signal corresponding to the total frequency response curve (i.e., line 1575) may further be processed by a processing circuit to improve the performance of the microphone. For example, the processing circuit may generate sub-band signals based on the total signal according to one or more bandpass filters and perform one or more functions (e.g., amplification, modulation, etc.) on the sub-band signals for further processing, thereby improving the sensitivity of the microphone.

Figure 16A:
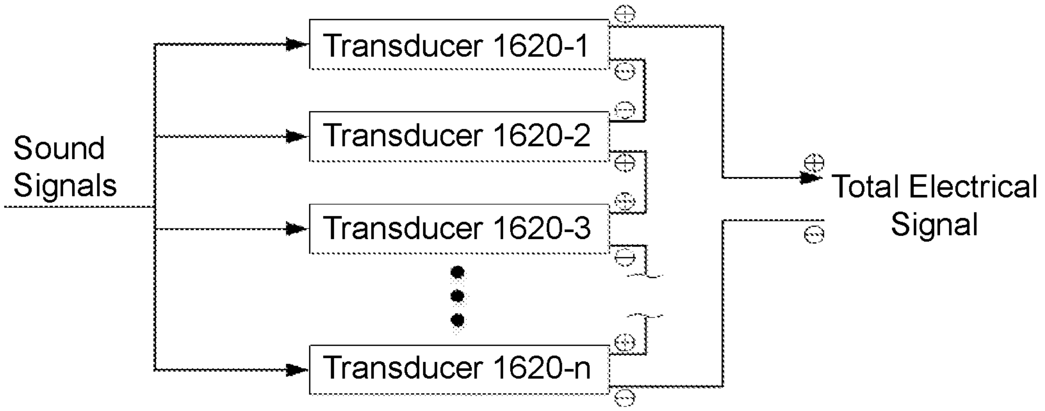
FIG. 16A is a schematic diagram illustrating an exemplary process for processing at least two electrical outputs of at least two transducers of a microphone according to some embodiments of the present disclosure.

FIG. 16A is a schematic diagram illustrating an exemplary process for processing at least two electrical outputs of at least two transducers of a microphone according to some embodiments of the present disclosure. As shown in FIG. 16A, transducers 1620-1, 1620-2, 1620-3, . . . , **1620-*n* may be sorted in an ascending order according to their resonance frequencies. Each transducer may output an electrical output. A processing circuit (e.g., the processing circuit 1450) may optionally reverse the phases of part of the electrical outputs (e.g., an electrical output of the transducer 1620-2), and maintain the phases of another part of the electrical outputs (e.g., electrical outputs of the transducers 1620-1 and/or 1620-3**).

Specifically, as illustrated in FIG. 16A, the arrangement of a pair of symbols "⊕" and "⊖" marked around each transducer may indicate a processing mode for the corresponding electrical output, i.e., maintaining or reversing the phase of an electrical output of a transducer. For example, the arrangement of the symbols marked around the transducer 1620-2 is reverse to that of the transducer 1620-1, that is, the processing mode for the electrical output of the transducer 1620-1 may be different from the processing mode for the electrical output of the transducer 1620-2. In other words, if the processing circuit maintains the phase of the electrical output of the transducer 1620-1, the processing circuit may reverse the phase of the electrical output of the transducer 1620-2. If the processing circuit maintains the phase of the electrical output of the transducer 1620-2, the processing circuit may reverse the phase of the electrical output of the transducer 1620-1. As described elsewhere in the present disclosure, a processing mode that maintaining phases of part of electrical outputs and reversing phases of another part of other electrical outputs may be referred to as a Positive-Negative-Negative-Positive (PNNP) processing mode. In some embodiments, the processing circuit may reverse the phases of electrical outputs of transducers arranged in an odd-numbered position, and maintain the phases of electrical outputs of transducers arranged in an even-numbered position. The transducers may be sorted in an ascending/descending order according to their resonance frequencies. In some embodiments, the processing circuit may reverse any one electrical output (e.g., the electrical output with the largest resonance frequency), and maintains any one other electrical output (e.g., the electrical output with the smallest resonance frequency).

For illustration purposes, the electrical outputs of the transducers 1620-1 and 1620-2 may be taken as examples. When the processing circuit process a first electrical output of the transducer 1620-1 and a second electrical output of the transducer 1620-2 using the PNNP processing mode, i.e., the processing circuit may maintain the phase of the first electrical output and reverse the phase of the second electrical output. Specifically, in this case, when the microphone works at a first frequency less than the first-order resonance frequency of the microphone, the first phase may be denoted as $\theta_1=0°$, and the reversed second phase may be denoted as $\theta_2=180°$, thus according to Equations (6-8), $u=|u_1+u_2|=|U_1-U_2|$. When the microphone works at the second frequency greater than the first-order resonance frequency and less than the second-order resonance frequency of the microphone, the first phase may be same as the reversed second phase, i.e., $\theta_1=\theta_2=180°$, thus $u=|u_1+u_2|=|-U_1-U_2|$. It should be noted that the sensitivity of each of the transducers 1620-1 and 1620-2 may be relatively low in the frequency band before the first-order resonance frequency compared to the sensitivity at the first-order resonance frequency. As the frequency approaches the first-order resonance frequency, the decisive component of the total signal is $U_1$, thus $U_1-U_2$ may still be large. After the first-order resonance frequency, the first phase changes to $\theta_1=180°$, thus $u=|u_1+u_2|=|U_1+U_2|$. As a result, when the first electrical output and the second electrical output are superimposed after using the PNNP processing mode, a total frequency response of the microphone may have a shallow valley between the resonance frequencies of the transducers 1620-1 and 1620-2 (i.e., a total signal of the first electrical output and the second electrical output at the valley may be stronger than any one of the first electrical output and the second electrical output), making the total frequency response curve of the microphone more even, e.g., as illustrated in FIG. 16B.

Figure 16B:
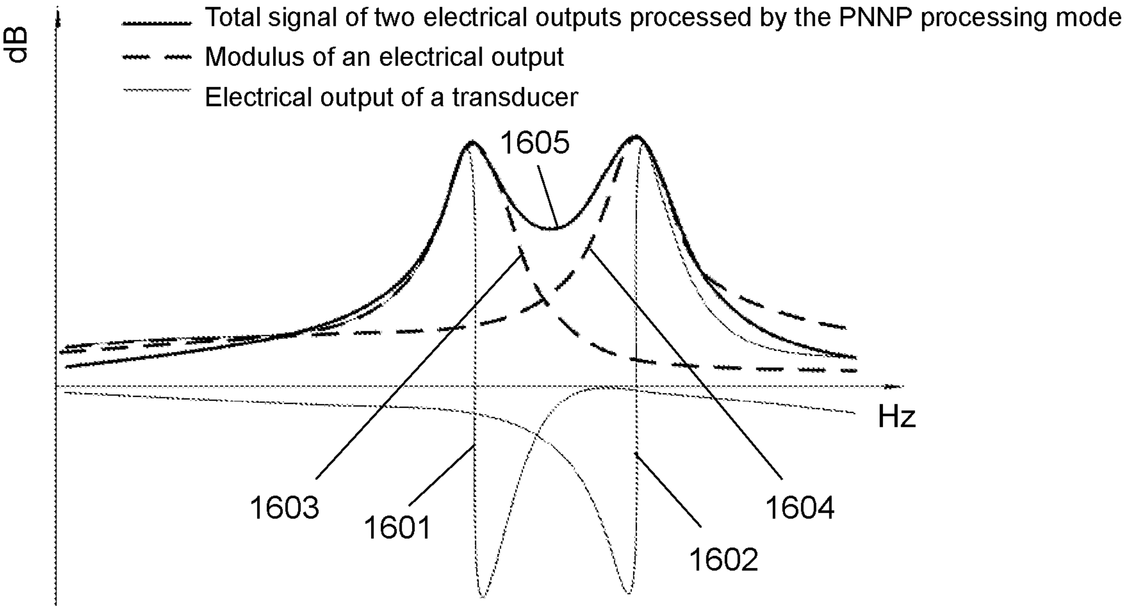
FIG. 16B is a schematic diagram illustrating exemplary curves each of which represents a relationship between an electrical output of a transducer and a frequency, exemplary curves each of which represents a relationship between the modulus of the electrical output and the frequency, and a curve representing a relationship between a total signal of the electrical output and the frequency according to some embodiments of the present disclosure.

FIG. 16B is a schematic diagram illustrating exemplary curves each of which represents a relationship between an electrical output of a transducer and a frequency, exemplary curves each of which represents a relationship between the modulus of the electrical output and the frequency, and a curve representing a relationship between a total signal of the electrical output and the frequency according to some embodiments of the present disclosure. As shown in FIG. 16B, each of lines 1601 and 1602 represents a curve representing a relationship between an electrical output of one transducer and a frequency. Each of lines 1603 and 1604 represents a curve representing a relationship between the modulus of the electrical output and the frequency, which may also be referred to as a frequency response curve of the transducer. Line 1605 represents the curve representing a relationship between the total signal of the electrical outputs of two transducers and the frequency, which may also be referred to as a total frequency response curve of a microphone including the two transducers. The two transducers of the microphone may not connect to each other via any damping layer. The total frequency response curve may be obtained using the PNNP processing mode as described in FIGS. 14 and 16A. According to FIG. 16B, the phase of an electrical output of a certain transducer may be changed by 180° when the vibration frequency shifts from a frequency lower than the resonance frequency of the certain transducer to a frequency higher than that resonance frequency (see, lines 1601 and 1602). Each of the two transducers may provide a distinctive resonance peak to the total frequency response curve. Due to the shallow valley between the two resonance frequencies of the two transducers caused by the PNNP processing mode, the sensitivity of the microphone between resonance peaks of the two transducers (represented by line 1605) may be higher than the sensitivity of any one of the two transducers (represented by lines 1603 or 1604). As a result, the sensitivity of a microphone including at least two transducers may be increased by superimposing electrical outputs of the at least two transducers using the PNNP processing mode. For example, by reasonable setting resonance frequencies of the at least two transducers, a total signal between two adjacent resonance frequencies may be close to a total signal at one of the adjacent response frequencies, thereby making the total frequency response of the microphone extremely sensitive, and the frequency response curve flat.

Figure 17A:
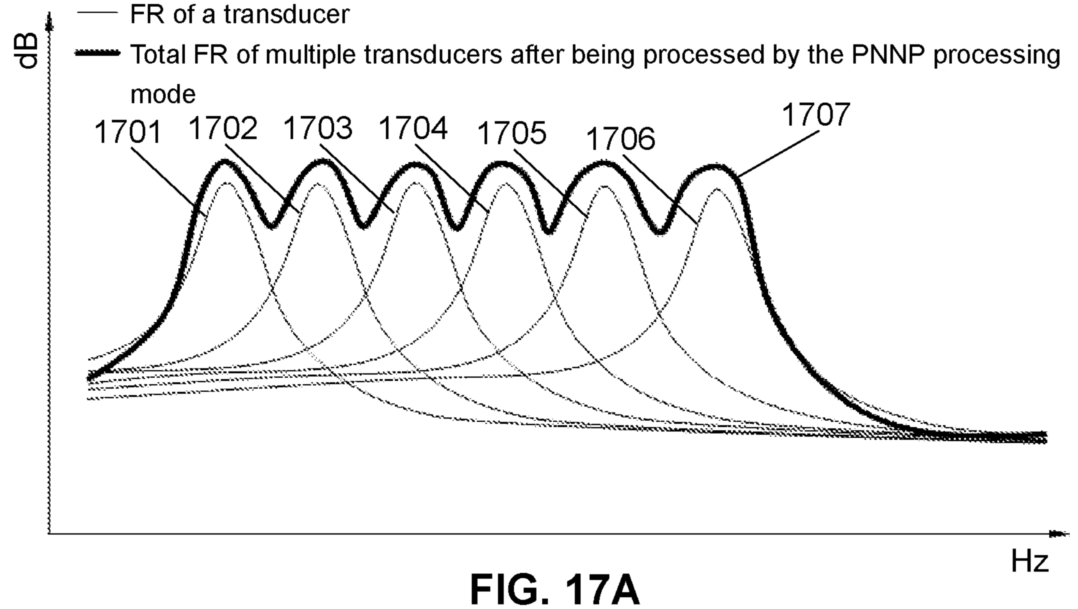
FIG. 17A is a schematic diagram illustrating exemplary frequency response curves of multiple transducers, and a total frequency response curve of a microphone including the multiple transducers according to some embodiments of the present disclosure.

FIG. 17A is a schematic diagram illustrating exemplary frequency response curves of multiple transducers, and a total frequency response curve of a microphone including the multiple transducers according to some embodiments of the present disclosure. As shown in FIG. 17A, lines 1701, 1702, 1703, 1704, 1705, and 1706 represent the frequency response curves of the multiple transducers, respectively. Line 1707 represents the total frequency response curve of the microphone including the multiple transducers. The multiple transducers of the microphone may not connect to each other via any damping layer. The total frequency response curve may be obtained using the PNNP processing mode as described elsewhere in the present disclosure (e.g., FIG. 16A and the descriptions thereof). According to FIG. 17A, each of the multiple transducers may provide a distinctive resonance peak to the total frequency response curve. The sensitivity of the microphone (represented by line 1707) may be higher than the sensitivity of any one of the multiple transducers (represented by lines 1701, 1702, 1703, 1704, 1705, or 1706). A valley between any two adjacent resonance frequencies of the microphone caused by the PNNP processing mode may be shallow. In other words, the total frequency response curve may be relatively flat. In some embodiments, a damping layer may be added to at least one of the multiple transducers to reduce the Q value of the corresponding transducer. As a result, the total frequency response curve of the microphone may be flatter (e.g., see FIG. 17B).

Figure 17B:
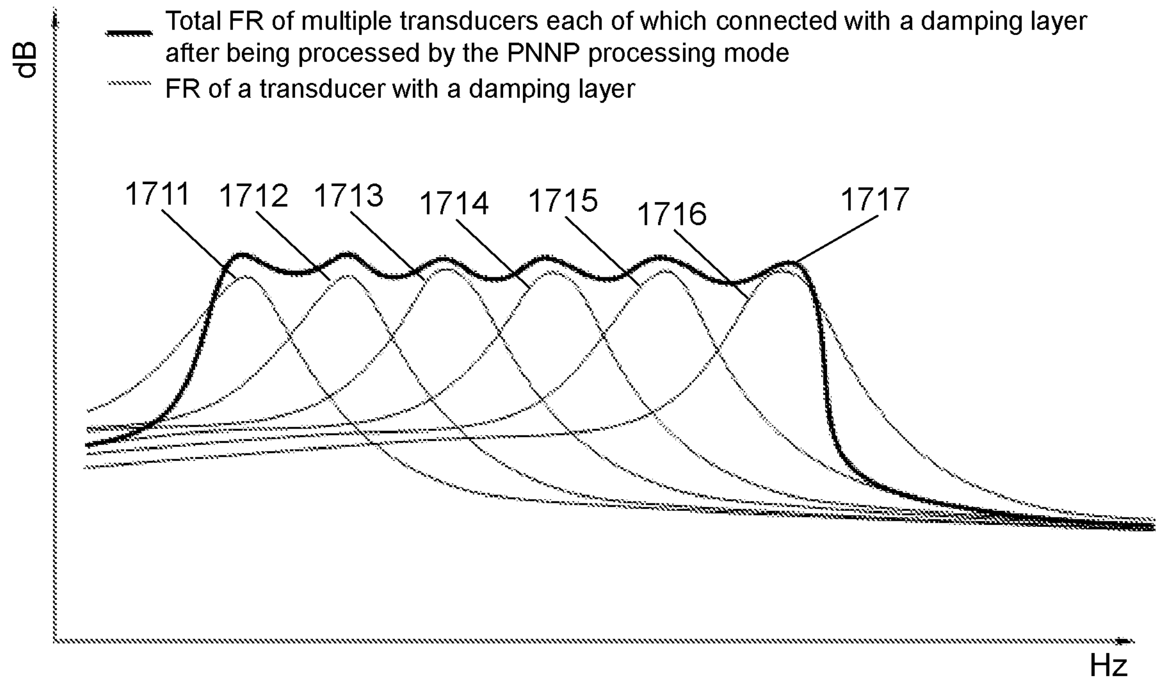
FIG. 17B is a schematic diagram illustrating exemplary frequency response curves of multiple transducers with damping layers, and a total frequency response curve of a microphone including the multiple transducers with the damping layers according to some embodiments of the present disclosure.

FIG. 17B is a schematic diagram illustrating exemplary frequency response curves of multiple transducers with damping layers, and a total frequency response curve of a microphone including the multiple transducers with the damping layers according to some embodiments of the present disclosure. As shown in FIG. 17B, lines 1711, 1712, 1713, 1714, 1715, and 1716 represent the frequency response curves of the multiple transducers with the damping layers, respectively. Line 1717 represents the total frequency response curve of the microphone including the multiple transducers with the damping layers. The multiple transducers may not connect to each other via any damping layer. Each of the multiple transducers of the microphone may connect to one or more damping layers. The one or more damping layers may adjust a composite damping of each transducer to reduce the Q value of each transducer. The total frequency response curve may be obtained using the PNNP processing mode as described elsewhere in the present disclosure (e.g., FIG. 16A and the descriptions thereof). A valley between any two adjacent resonance frequencies of the microphone caused by the PNNP processing mode may be shallow. As a result, by adjusting the composite damping of each of the multiple transducers independently of each other, the flatness of the total frequency response curve may be adjusted.

Figure 17C:
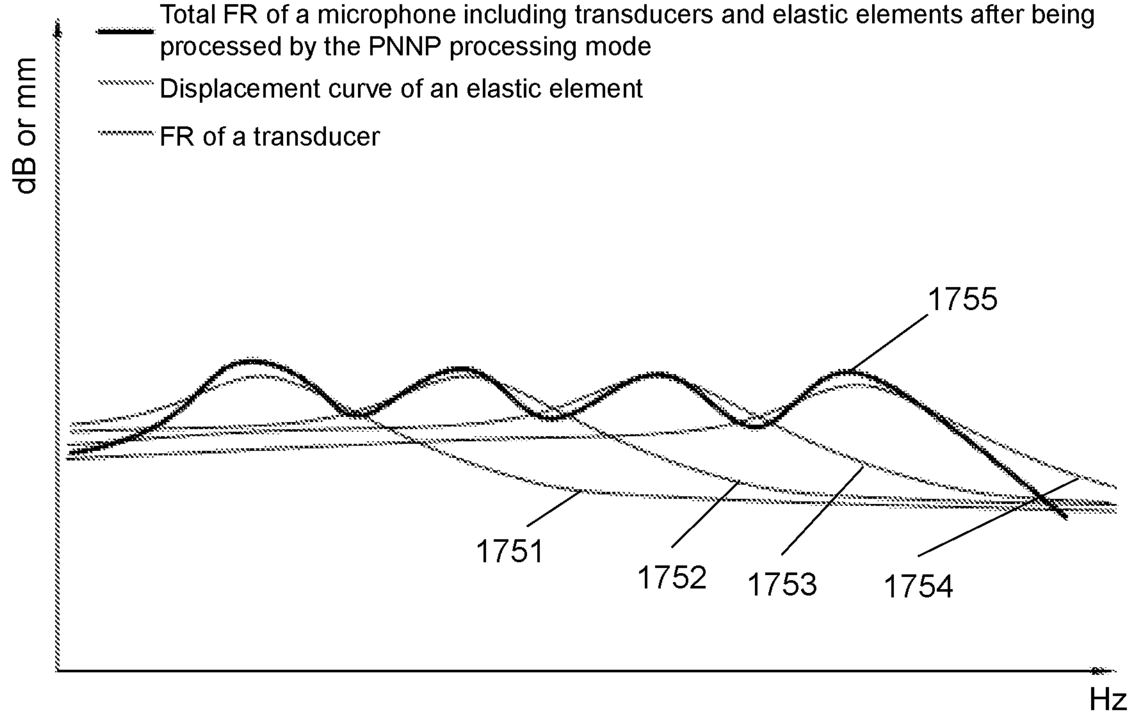
FIG. 17C is a schematic diagram illustrating exemplary frequency response curves of a first transducer and a second transducer, exemplary displacement curves of a first elastic element and a second elastic element, and a total frequency response curve of a microphone including the two transducers and the two elastic elements according to some embodiments of the present disclosure.

FIG. 17C is a schematic diagram illustrating exemplary frequency response curves of a first transducer and a second transducer, exemplary displacement curves of a first elastic element and a second elastic element, and a total frequency response curve of a microphone including the two transducers and the two elastic elements according to some embodiments of the present disclosure. As shown in FIG. 17C, lines 1751 and 1753 represent the frequency response curves of the first transducer and the second transducer, respectively. Lines 1752 and 1754 represent displacement curves of the first elastic element and the second elastic element, respectively. Line 1555 represents the total frequency response curve of the microphone including the two transducers and the two elastic elements. The first transducer and the second transducer may be independently arranged in the microphone. The first elastic element may be connected to the first transducer, and the second elastic element may be connected to the second transducer via a damping layer. Each elastic element may transfer vibrations to the corresponding transducer and thus provide a distinctive resonance peak to the corresponding transducer. In this way, each transducer may output an electrical output having two resonance peaks. Since the resonance frequencies of the electrical outputs of the transducers do not cross each other, the sensitivity of the total frequency response curve may be improved by using the PNNP processing mode as described elsewhere in the present disclosure (e.g., FIG. 16A and the descriptions thereof). In some embodiments, the composite damping of the transducer(s) and/or the elastic element(s) may be adjusted by damping layers (e.g., the damping layer connected the transducer and the corresponding elastic element or one or more additional damping layers). The damping layers may reduce the Q value of each transducer and/or each elastic element. As a result, a deep valley between two adjacent resonance frequencies of the electrical outputs of the first transducer and the second transducer caused as described in FIG. 15A to 15C may be avoided. In other words, the total frequency response curve may be relatively flat.

Figure 18A:
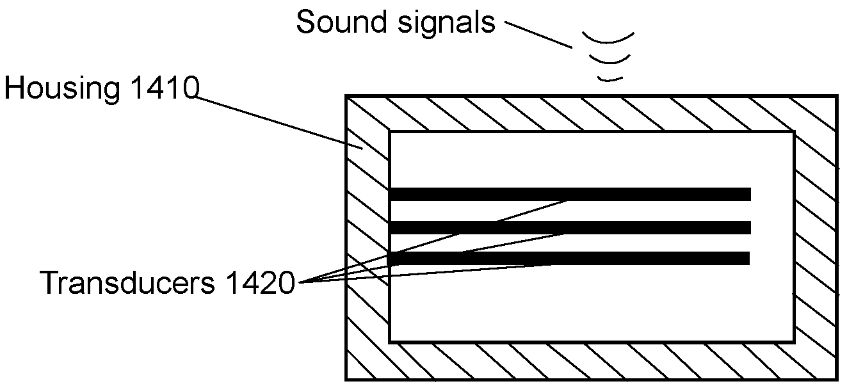
FIG. 18A is a structural schematic diagram illustrating an exemplary microphone according to some embodiments of the present disclosure.

FIG. 18A is a structural schematic diagram illustrating an exemplary microphone according to some embodiments of the present disclosure. As shown in FIG. 18A, the microphone 1400 may include a housing 1410 and three cantilever transducers 1420. Each of the three cantilever transducers 1420 may be connected to the housing 1410 at an end. Each cantilever transducer may vibrate in response to the sound signals and output an electrical output to a processing circuit 1450. The processing circuit may process the electrical outputs using the PNNP processing mode. On this occasion, each cantilever transducer may provide a distinctive resonance peak to the microphone 1400. In other words, the frequency response curve of the microphone 1400 may include three resonance peaks each of which corresponds to one cantilever transducer.

Figure 18B:
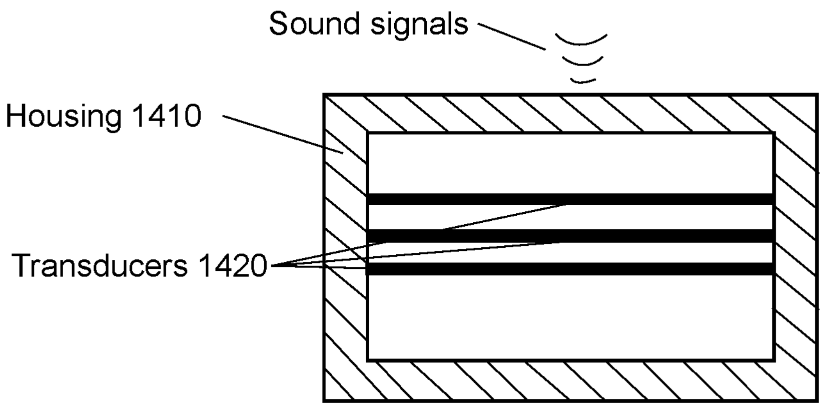
FIG. 18B is a structural schematic diagram illustrating an exemplary microphone according to some embodiments of the present disclosure.

FIG. 18B is a structural schematic diagram illustrating an exemplary microphone according to some embodiments of the present disclosure. As shown in FIG. 18B, the microphone 1400 may include a housing 1410 and three transducers 1420. Each transducer may vibrate in response to the sound signals. For example, in the case of a bone conduction microphone, each of the three transducers 1420 may be directly attached to the housing and vibrate with the vibration of the housing 1410. In the case of an air conduction microphone, the housing 1410 may include one or more opening that let in air conduction sound, and each of the three transducers 1420 may vibrate in response to the air vibration inside the housing 1410. Similar to FIG. 18A, each transducer may output an electrical output to a processing circuit, and the processing circuit may process the electrical outputs using the PNNP processing mode, causing the frequency response curve of the microphone 1400 having resonance peaks corresponded to the three transducers.

Figure 18C:
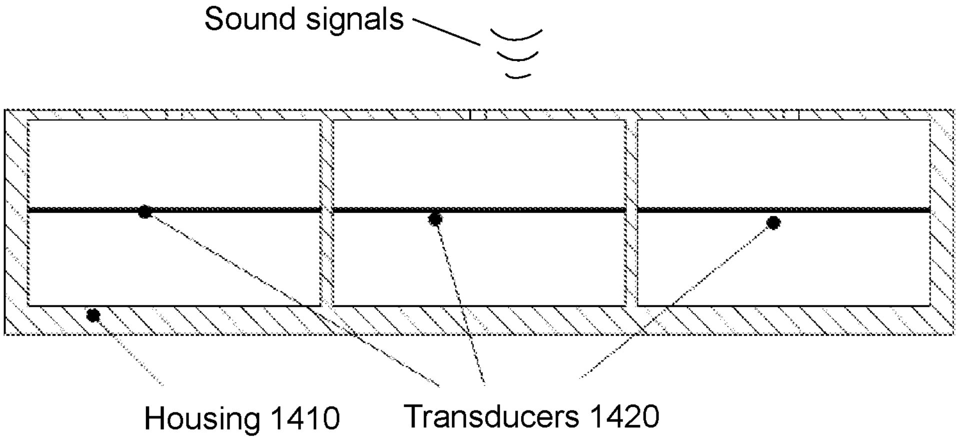
FIG. 18C is a structural schematic diagram illustrating an exemplary microphone according to some embodiments of the present disclosure.

FIG. 18C is a structural schematic diagram illustrating an exemplary microphone according to some embodiments of the present disclosure. As shown in FIG. 18C, the microphone 1400 may include a housings 1410, three transducers 1420. The housing 1410 may include three accommodation spaces each of which may accommodate a transducer. Similar to FIG. 18B, each transducer may output an electrical output in response to the sound signals and transmit the electrical output to a processing circuit. The processing circuit may process the electrical outputs using the PNNP processing mode, causing the frequency response curve of the microphone 1400 having resonance peaks corresponded to the three transducers.

Figure 18D:
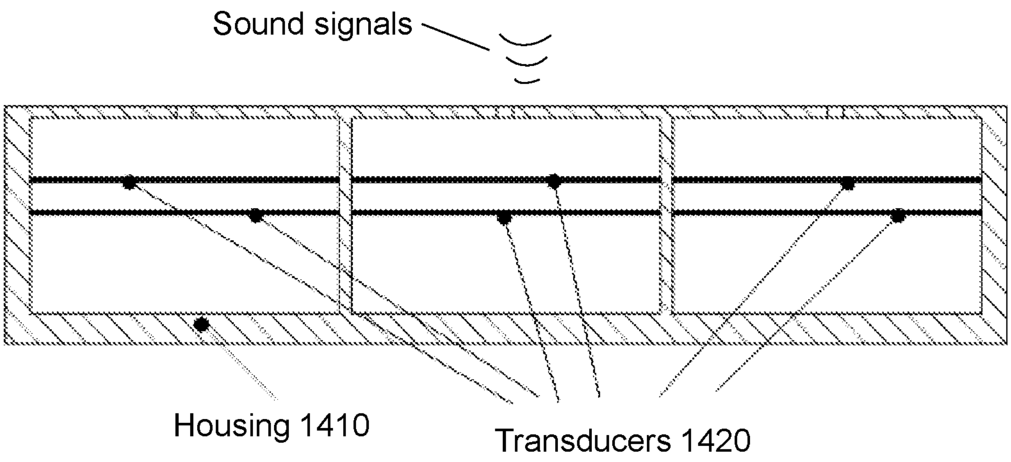
FIG. 18D is a structural schematic diagram illustrating an exemplary microphone according to some embodiments of the present disclosure.

FIG. 18D is a structural schematic diagram illustrating an exemplary microphone according to some embodiments of the present disclosure. As shown in FIG. 18D, the microphone 1400 may include a housing 1410 including three accommodation spaces, six transducers 1420 connecting to the housing 1410, respectively. Each of the three accommodation spaces may correspond to two of the six transducers 1420. Each of the six transducers 1420 may fix to the housing 1410 at two ends of each of the six transducers 1420.

Figure 19:
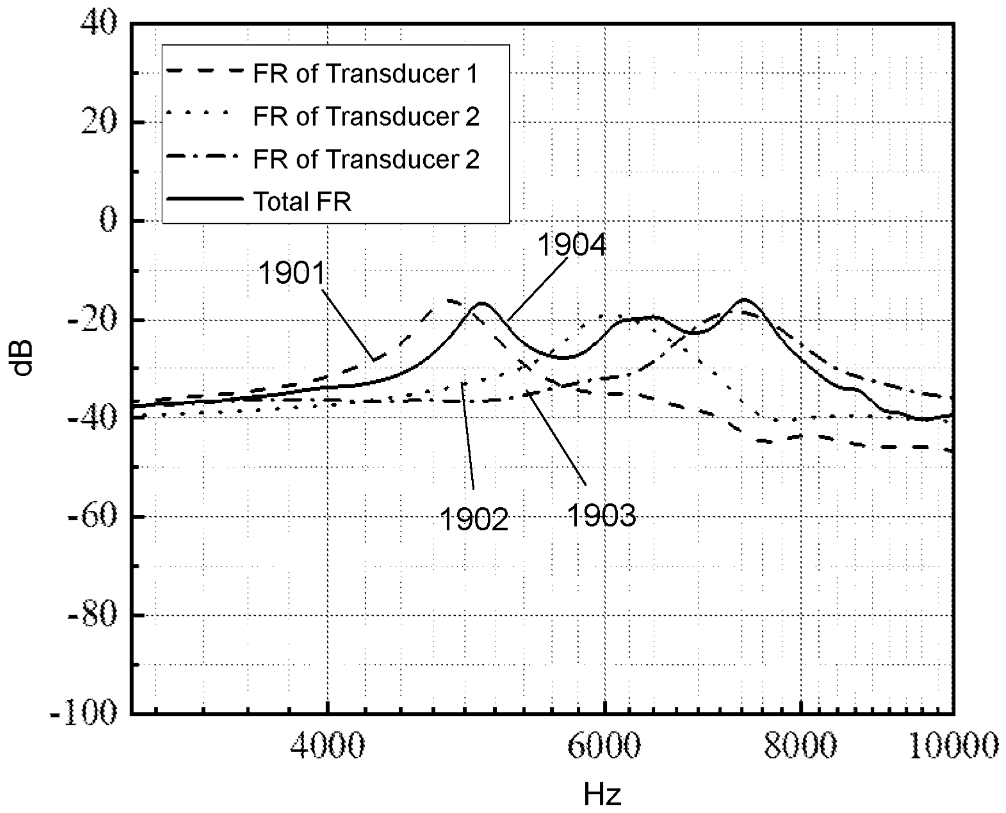
FIG. 19 is a schematic diagram illustrating exemplary frequency response curves of different transducers according to some embodiments of the present disclosure.

FIG. 19 is a schematic diagram illustrating exemplary frequency response curves of different transducers according to some embodiments of the present disclosure. As shown in FIG. 19, lines 1901, 1902, and 1903 represent the frequency response curves of the transducer 1, transducer 2, and transducer 3, respectively. Line 1904 represents a total frequency response curve of a microphone including transducer 1, transducer 2, and transducer 3. Transducer 1, transducer 2, and transducer 3 of the microphone may not connect to each other via any damping layer. Each transducer herein may act as an output transducer and output an electrical output to a processing circuit. The processing circuit may process the electrical outputs to generate a total signal using the PNNP processing mode as described in FIG. 16A. In this way, the total frequency response curve corresponding to the total signal may have resonance peaks correspond to the transducers. According to FIG. 19, each transducer may provide a distinctive resonance peak to the total frequency response curve. The sensitivity of the microphone (represented by line 1904) may be higher than the sensitivity of any one of the transducers (represented by lines 1901, 1902, or 1903). The total frequency response curve may be flatter than each frequency response curve of the transducers.

Figure 20A:
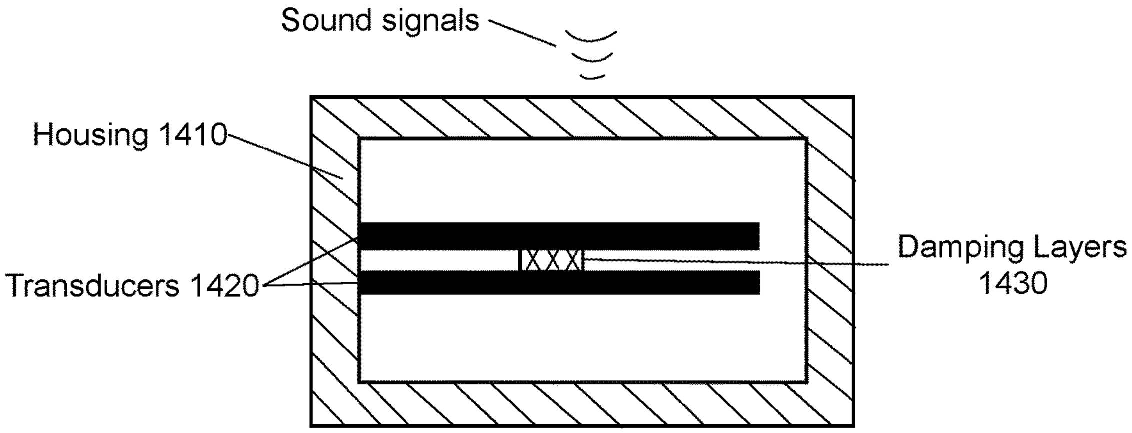
FIG. 20A is a structural schematic diagram illustrating an exemplary microphone according to some embodiments of the present disclosure.
Figure 20B:
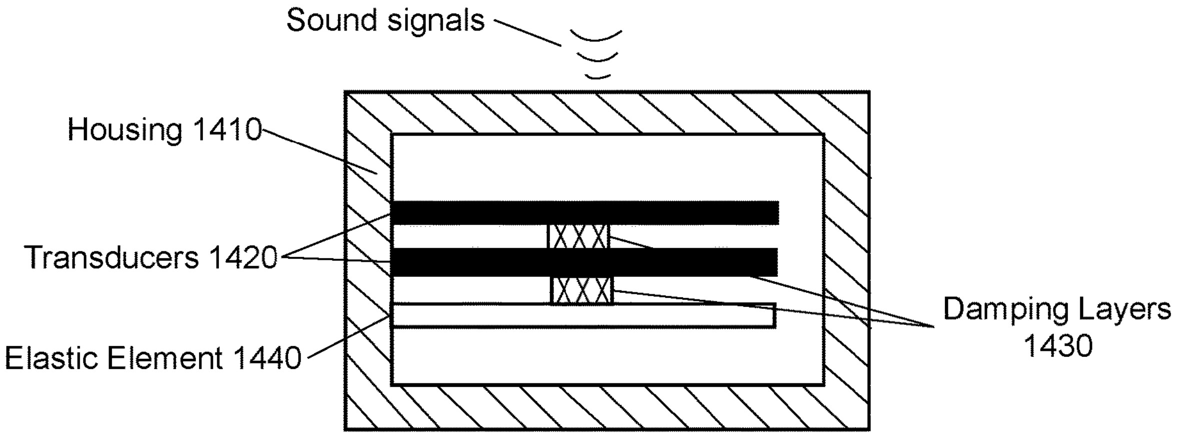
FIG. 20B is a structural schematic diagram illustrating an exemplary microphone according to some embodiments of the present disclosure.
Figure 20C:
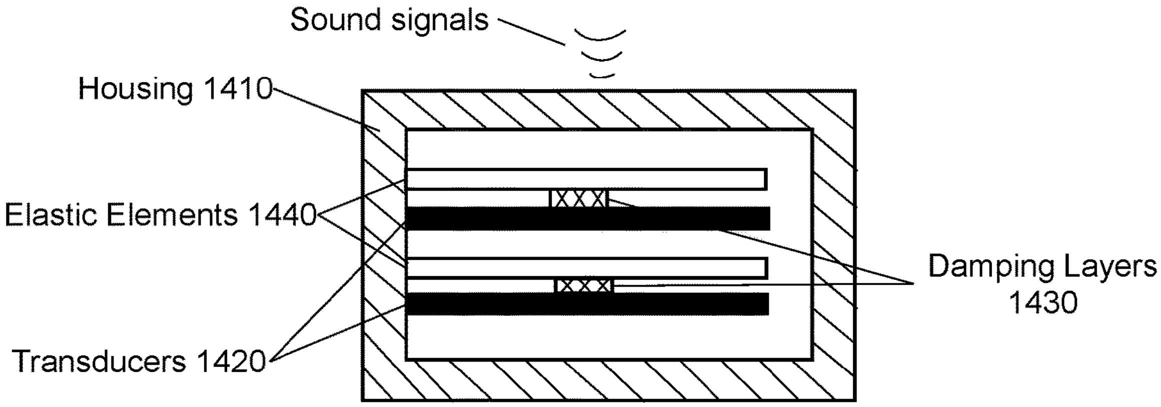
FIG. 20C is a structural schematic diagram illustrating an exemplary microphone according to some embodiments of the present disclosure.

FIG. 20A is a structural schematic diagram illustrating an exemplary microphone according to some embodiments of the present disclosure. As shown in FIG. 20A, the microphone 1400 may include a housing 1410, two cantilever transducers 1420 connecting to the housing 1410, respectively, and a damping layer 1430 connected to each of the two cantilever transducers 1420 and disconnected to the housing 1410. Similar to FIG. 8, the two cantilever transducers 1420 may be disposed on opposite sides of the damping layer 1430. The damping layer 1430 may cover an upper surface of one of the two cantilever transducers 1420 and a lower surface of the other of the two cantilever transducers 1420. Each of the two cantilever transducers 1420 may be fixed to the housing 1410 at an end (also referred to as "fixed end"). On this occasion, each cantilever transducer may vibrate in response to the vibrations of the housing 1410 (via the fixed end) and the other cantilever transducer (via the damping layer), and thus cause each cantilever transducer 1420 to generate an electrical output with two resonance peaks. The sensitivity of a frequency response curve corresponding to a total signal of the two electrical outputs may be improved by directly superimposing the two electrical outputs (i.e., using the PNP processing mode). Additionally, the damping layer 130 may help reduce the Q value of the output transducer, thus making the frequency response of the microphone flatter.

FIG. 20B is a structural schematic diagram illustrating an exemplary microphone according to some embodiments of the present disclosure. As shown in FIG. 20B, the microphone 1400 may include a housing 1410, two cantilever transducers 1420, two damping layers 1430, and an elastic element 1440. Similar to FIG. 12C, the two cantilever transducers 1420, the elastic element 1440, and the two damping layers 1430 may form a sandwich structure. The elastic element 1440 may vibrate in response to, for example, the air vibration in the housing 1410, transferring its vibration to the damping layer 1430 and further to the two transducers 1420. Each transducer herein may act as the output transducer, the vibrations of the elastic element 1440 and the other one of the two transducers 1420 may provide two distinctive resonance peaks to the output transducer. Thus, the output transducer may output an electrical output with three resonance frequencies. The sensitivity of a frequency response curve corresponding to a total signal of the two electrical outputs may be improved by directly superimposing the two electrical outputs (i.e., using the PNP processing mode). Additionally, the damping layer 130 may help reduce the Q value of the output transducer, thus making the frequency response of the microphone flatter.

FIG. 20C is a structural schematic diagram illustrating an exemplary microphone according to some embodiments of the present disclosure. As shown in FIG. 20C, the microphone 1400 may include a housing 1410, two cantilever transducers 1420, two damping layers 1430, and two elastic elements 1440. Each of the two cantilever transducers 1420 and the two elastic elements 1440 may connect to the housing 1410, respectively. Each of the two cantilever transducers 1420 may connect to one of the two elastic elements 1440. As shown in FIG. 20C, each of the two cantilever transducers 1420 and the corresponding elastic element 1440, and the damping layer 1430 may form a sandwich structure. The elastic element may provide a distinctive resonance peak to its corresponding cantilever transducer. Therefore, each cantilever transducer may output an electrical output with two resonance frequencies. If the resonance frequencies of the electrical outputs of the two cantilever transducers 1420 do not cross each other, the sensitivity of a frequency response curve corresponding to a total signal of the two electrical outputs may be improved by using the PNNP processing mode. Optionally, if the resonance frequencies of the electrical outputs of the two cantilever transducers 1420 cross each other, the sensitivity of a frequency response curve corresponding to a total signal of the two electrical outputs may be improved by directly superimposing the two electrical outputs, without reversing the phase of any electrical output. Additionally, the damping layer 130 may help reduce the Q value of the output transducer, thus making the frequency response of the microphone flatter.

Figure 20D:
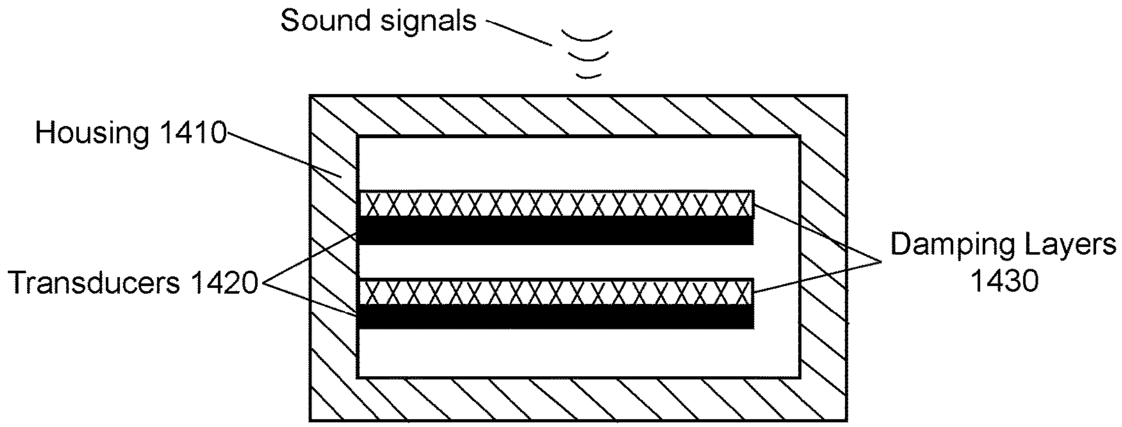
FIG. 20D is a structural schematic diagram illustrating an exemplary microphone according to some embodiments of the present disclosure.

FIG. 20D is a structural schematic diagram illustrating an exemplary microphone according to some embodiments of the present disclosure. As shown in FIG. 20D, the microphone 1400 may include a housing 1410, two cantilever transducers 1420, and two damping layers 1430. Each of the two cantilever transducers 1420 may connect to the housing 1410. Each of the two cantilever transducers 1420 may connect to one of the two damping layers 1430. Each damping layer may adjust the composite damping of the corresponding cantilever transducer to reduce the Q value of the corresponding cantilever transducer. Therefore, after being processed using the PNNP processing mode, a frequency response curve corresponding to a total signal of two electrical outputs of the two cantilever transducers may be flatter.

Figure 20E:
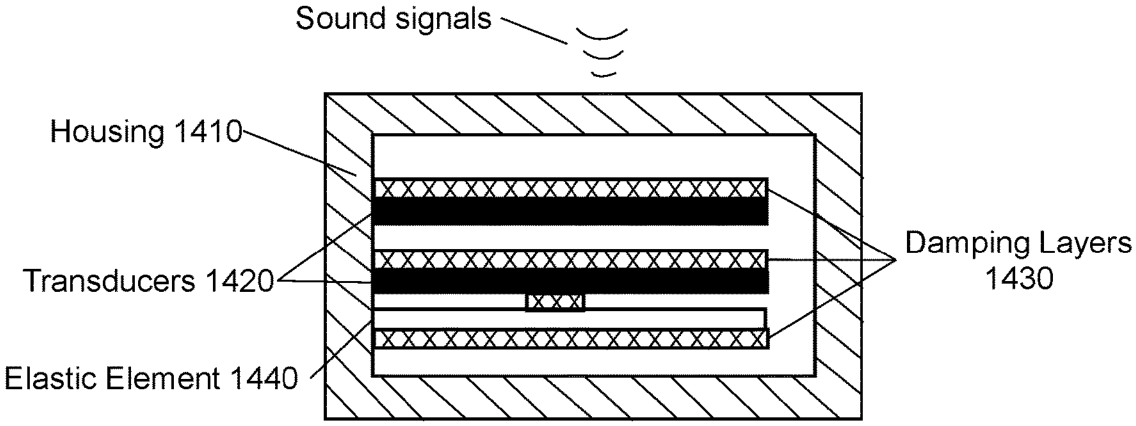
FIG. 20E is a structural schematic diagram illustrating an exemplary microphone according to some embodiments of the present disclosure.

FIG. 20E is a structural schematic diagram illustrating an exemplary microphone according to some embodiments of the present disclosure. As shown in FIG. 20E, the microphone 1400 may include a housing 1410, two cantilever transducers 1420 (e.g., a first transducer and a second transducer), an elastic element 1440, and four damping layers 1430. Each of the two cantilever transducers 1420 and the elastic element 1440 may connect to the housing 1410, respectively. One of the two cantilever transducers 1420 (e.g., the first transducer) may connect to the elastic elements 1440 via a damping layer (e.g., a first damping layer). The elastic element 1440 may vibrate in response to, for example, the air vibration in the housing 1410, transferring its vibration to the first damping layer and further to the first transducer. The vibrations of the elastic element 1440 may provide a distinctive resonance peak to the first transducer. Each transducer herein may act as the output transducer. Thus, the first transducer may output a first electrical output with two resonance frequencies, and the second transducer may output a second electrical output with one resonance frequency. Additionally, the four damping layers may adjust the composite damping of the corresponding cantilever transducer and the elastic element 1440 to reduce the Q value of the corresponding cantilever transducer and the elastic element 1440. Therefore, when the resonance frequencies of the electrical outputs of the two cantilever transducers 1420 do not cross each other, after being processed using the PNNP processing mode, the sensitivity of a frequency response curve corresponding to a total signal of two electrical outputs of the two cantilever transducers may be improved.

It should be noted that the exemplary microphones 1400 described in the present disclosure are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the housing 1410 of the microphone 1400 may include one or more openings to guide sound signals into the housing 1410 to cause any transducer in the housing 1410 to vibrate to output an electrical output (e.g., when the microphone 1400 is an air conduction microphone). In such a case, the cantilever transducer above may be replaced with a diaphragm that is more sensitive to air vibration. As another example, the microphone 1400 may include a structure same as the microphone 100 (e.g. structures illustrated in FIGS. 6A-6C, 7A-7C, 8, 9A-9C, 10A-10D, 12A-12D, etc.). Each transducer included in the microphone 1400 may output an electrical output. As a further example, different transducers may be of different types. The transducers in the microphone 1400 may include bone conduction transducers, air conduction transducers, or a combination thereof. As still a further example, different damping layers may be made of the same or different materials. Each damping layer may be optionally connected to or disconnected to the housing. The count of the damping layers, the transducers, or the elastic elements may not be limited, and the positions of the damping layers with respect to the transducers and/or the elastic elements may be adjusted according to practical needs.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A microphone comprising:

a housing for receiving sound signals;

at least two transducers for vibrating to generate electrical signals in response to the sound signals, each of the at least two transducers providing a distinctive resonance peak to the microphone;

at least one elastic element connected to one of the at least two transducers via at least one damping layer; and a processing circuit for processing the electrical signals.

2. The microphone of claim 1, wherein the at least two transducers are arrayed in the housing in a direction parallel to a vibration direction of the at least two transducers.

3. The microphone of claim 1, wherein the at least two transducers are arrayed in the housing in a direction perpendicular to a vibration direction of the at least two transducers.

4. The microphone of claim 1, wherein the electrical signals are outputted from one of the at least two transducers, and the rest of the at least two transducers transfer vibrations to the one of the at least two transducers.

5. The microphone of claim 1, wherein the electrical signals include at least two electrical outputs of the at least two transducers, wherein each of the at least two electrical outputs of the at least two transducers is outputted from one of the at least two transducers.

6. The microphone of claim 5, wherein the at least two electrical outputs of the at least two transducers are processed using a Positive-Negative-Negative-Positive processing mode, wherein the Positive-Negative-Negative-Positive processing mode includes:

adjusting phases of the at least two electrical outputs; and combining the adjusted at least two electrical outputs.

7. The microphone of claim 6, wherein the adjusting phases of the at least two electrical outputs includes:

reversing a phase of one of the at least two electrical outputs, and maintaining a phase of another one of the at least two electrical outputs.

8. The microphone of claim 5, wherein the at least two electrical outputs are of adjacent transducers among the at least two transducers which are sorted in a descending order or an ascending order according to their resonance frequencies.

9. The microphone of claim 1, wherein the two transducers are disposed on a same side or opposite side of the damping layer.

10. The microphone of claim 1, wherein the at least one damping layer covers at least part of at least one surface of the transducer connected thereto.

11. The microphone of claim 10, wherein the at least one damping layer is disposed on at least one position including an upper surface of the connected transducer, a lower surface of the connected transducer, a lateral surface of the connected transducer, or an interior of the connected transducer.

12. The microphone of claim 10, wherein the at least one damping layer is disposed on at least one surface of the connected transducer at a predetermined angle.

13. The microphone of claim 12, wherein the predetermined angle is 30°, 45°, 60°, or 90°.

14. The microphone of claim 10, wherein the at least one damping layer is connected to the housing.

15. The microphone of claim 10, wherein the at least one damping layer includes at least two damping layers, and the at least two damping layers are arranged symmetrically with respect to a center line of one of the at least two transducers.

16. The microphone of claim 1, wherein the at least one elastic element and the at least two transducers are arrayed in the housing in a direction perpendicular to a vibration direction of the at least two transducers.

17. The microphone of claim 1, wherein the at least one damping layer covers at least part of at least one surface of the at least one elastic element.

18. The microphone of claim 1, wherein a width or thickness of the at least one damping layer is variable.

19. The microphone of claim 1, wherein a structure of each of the at least two transducers includes at least one of a film, a cantilever, or a plate.

20. An electronic device comprising a microphone, wherein the microphone includes:

a housing for receiving sound signals;

at least two transducers for vibrating to generate electrical signals in response to the sound signals, each of the at least two transducers providing a distinctive resonance peak to the microphone;

at least one elastic element connected to one of the at least two transducers via at least one damping layer; and a processing circuit for processing the electrical signals.

* * * * *